US012617889B1

(12) United States Patent
Pagels et al.

(10) Patent No.: US 12,617,889 B1
(45) Date of Patent: May 5, 2026

(54) POLYMERS FOR USE AS ANION EXCHANGE MEMBRANES

(71) Applicant: Envision Energy USA Ltd., Burlington, MA (US)

(72) Inventors: Michael K. Pagels, Lowell, MA (US); Cheyenne R. Peltier, Arlington, MA (US)

(73) Assignee: Envision Energy USA Ltd., Burlington, MA (US)

( * ) Notice: Subject to any disclaimer, the term of this patent is extended or adjusted under 35 U.S.C. 154(b) by 0 days.

(21) Appl. No.: 19/293,356

(22) Filed: Aug. 7, 2025

(51) Int. Cl.

| | |
|---|---|
| ***C08F 10/04*** | (2006.01) |
| ***B01D 67/00*** | (2006.01) |
| ***B01D 69/02*** | (2006.01) |
| ***B01D 71/82*** | (2006.01) |
| ***B01J 41/13*** | (2017.01) |
| ***B01J 47/12*** | (2017.01) |
| ***C08G 10/04*** | (2006.01) |

(Continued)

(52) U.S. Cl.

CPC .......... *C08G 10/04* (2013.01); *B01D 67/0011* (2013.01); *B01D 67/0013* (2013.01); *B01D 69/02* (2013.01); *B01D 71/82* (2013.01); *B01J 41/13* (2017.01); *B01J 47/12* (2013.01); *C08J 5/2262* (2013.01); *C25B 13/08* (2013.01); *H01M 8/0293* (2013.01); *B01D 2325/16* (2013.01); *B01D 2325/42* (2013.01); *C08J 2361/18* (2013.01)

(58) Field of Classification Search

CPC ............... B01D 67/0011; B01D 71/82; B01D 2325/16; B01D 2325/42; B01J 41/13; C08J 2361/18

See application file for complete search history.

(56) References Cited

U.S. PATENT DOCUMENTS

| | | | |
|---|---|---|---|
| 10,435,504 | B2 | 10/2019 | Bae et al. |
| 11,987,664 | B2 | 5/2024 | Bae et al. |

(Continued)

FOREIGN PATENT DOCUMENTS

| | | | |
|---|---|---|---|
| CN | 109320692 | B | 1/2020 |
| CN | 113583279 | A | 11/2021 |

(Continued)

OTHER PUBLICATIONS

Machine-generated English language translation of CN 118027323A, published May 14, 2024, 29 pages, retrieved from Espacenet on Oct. 27, 2025. (Year: 2024).*

(Continued)

*Primary Examiner* — Fred M Teskin

(74) *Attorney, Agent, or Firm* — CALDWELL LLC

(57) ABSTRACT

Polymers for use as an Anion Exchange Membranes (AEMs) and produce an alkaline stable AEM. The multinuclear aromatic and amine-functionalized acetal (ketal) come together to form a polymer with a hydrocarbon backbone that is stable to alkaline conditions. The use of an amine-functionalized acetal allows for the incorporation of a stable cation, dimethyl piperidinium, in the most stable confirmation while avoiding incorporation of a CF3 group with every cation. The amines within the amine-functionalized polyaromatic that results from this polymerization are quaternized to form the desired cationic groups to create an AEM that is mechanically robust, conductive, and stable.

22 Claims, 7 Drawing Sheets

(51) Int. Cl.
*C08J 5/22* (2006.01)
*C25B 13/08* (2006.01)
*H01M 8/0293* (2016.01)

(56) References Cited

U.S. PATENT DOCUMENTS

| | | | |
|---|---|---|---|
| 2021/0009726 A1 | 1/2021 | Yan et al. | |
| 2021/0108067 A1 | 4/2021 | Bae et al. | |
| 2022/0072485 A1 | 3/2022 | Bahar et al. | |
| 2023/0102700 A1 | 3/2023 | Ba et al. | |
| 2024/0246070 A1 | 7/2024 | Wang et al. | |

FOREIGN PATENT DOCUMENTS

| | | | | |
|---|---|---|---|---|
| CN | 114276505 A | | 4/2022 | |
| CN | 116856004 A | * | 10/2023 | ............... C25B 1/04 |
| CN | 118027323 A | * | 5/2024 | ......... B01D 67/0002 |
| KR | 102492841 B1 | | 1/2023 | |
| WO | WO 2016/081432 A2 | * | 5/2016 | .......... H01M 8/1039 |
| WO | 2017172824 A1 | | 10/2017 | |
| WO | 2019068051 A1 | | 5/2019 | |
| WO | 2020198627 A1 | | 9/2020 | |
| WO | 2021150994 A1 | | 7/2021 | |

OTHER PUBLICATIONS

Machine-generated English language translation of CN 116856004A, published Oct. 10, 2023, 22 pages, retrieved from Espacenet on Oct. 27, 2025. (Year: 2023).*

Yuyang Lu et al Advanced cross-linked anion exchange membranes from acetal ethylene vinyl alcohol copolymer and quaternary ammonium poly(vinyl benzyl chloride) for fuel cell application Renewable Energy vol. 240, Feb. 15, 2025, 122224.

H Zhang et al Anion Exchange Membrane with Pendulous Piperidinium on Twisted All-Carbon Backbone for Fuel Cell Membranes 2024, 14, 121.

Woo-Hyung Lee Poly(terphenylene) Anion Exchange Membranes: The Effect of Backbone Structure on Morphology and Membrane Property 2017; American Chemical Society; vol. 6; Issue: 5.

Jiantao Fan et al Cationic Polyelectrolytes, Stable in 10 M KOHaq at 100° C. ACS Macro Lett. 2017, 6, 10, 1089-1093.

W.H Lee et al Fluorene-Based Hydroxide Ion Conducting Polymers for Chemically Stable Anion Exchange Membrane Fuel Cells ACS Macro Lett. 2015, 4, 4, 453-457.

A. M. A. Mahmoud High Hydroxide Ion Conductivity with Enhanced Alkaline Stability of Partially Fluorinated and Quaternized Aromatic Copolymers as Anion Exchange Membranes Macromolecules 2017, 50, 11, 4256-4266.

W.H Lee et al Robust Hydroxide Ion Conducting Poly(biphenyl alkylene)s for Alkaline Fuel Cell Membranes ACS Macro Lett. 2015, 4, 8, 814-818.

Andrew G Wright et al Hydroxide-Stable Ionenes ACS Macro Lett. 2014, 3, 5, 444-447.

Ryo et al Chemically Stable, Highly Anion Conductive Polymers Composed of Quinquephenylene and Pendant Ammonium Groups Macromolecules 2019, 52, 5, 2131-2138.

Dang et al Exploring Different Cationic Alkyl Side Chain Designs for Enhanced Alkaline Stability and Hydroxide Ion Conductivity of Anion-Exchange Membranes Macromolecules 2015, 48, 16, 5742-5751.

Thomas et al a Stable Hydroxide-Conducting Polymer J. Am. Chem. Soc. 2012, 134, 26, 10753-10756.

Park et al Chemically durable polymer electrolytes for solid-state alkaline water electrolysis J. Power Sources. 2019, 374, 367-372.

Maurya et al Rational design of polyaromatic ionomers for alkaline membrane fuel cells with >1 W cm-2 power density Energy Environ. Sci., 2018, 11, 3283-3291.

Malikah et al PPS-reinforced poly(terphenylene) anion-exchange membranes with different quaternary ammonium groups for use in water electrolysers J. Membr. Sci. 2024, 713, 123335.

Andrit et al Ether-free polyfluorenes tethered with quinuclidinium cations as hydroxide exchange membranes 14. J. Mater. Chem. A, 2019, 7, 27164-27174.

Taro et al Highly Anion Conductive Polymers: How Do Hexafluoroisopropylidene Groups Affect Membrane Properties and Alkaline Fuel Cell Performance? ACS Appl. Energy Mater. 2020, 3, 1, 469-477.

Pan et al Improving poly(arylene piperidinium) anion exchange membranes by monomer design J. Mater. Chem. A, 2022, 10, 16478-16489.

Olsspn et al Tuning poly(arylene piperidinium) anion-exchange membranes by copolymerization, partial quaternization and crosslinking J. Membr. Sci. 2019, 578, 183-195.

Allushi et al Highly conductive hydroxide exchange membranes containing fluorene-units tethered with dual pairs of quaternary piperidinium cations J. Membr. Sci. 2021, 632, 119376.

Pham et al Poly(arylene alkylene)s with pendant N-spirocyclic quaternary ammonium cations for anion exchange membranes J. Mater. Chem. A, 2018, 6, 16537-16547.

Wang et al Poly(aryl piperidinium) membranes and ionomers for hydroxide exchange membrane fuel cells Nature Energy 2019,4, 392-398.

Yin et al Polyarylmethylpiperidinium (PAMP) for Next Generation Anion Exchange Membranes Angew. Chem. Int. Ed. 2025, 64.

* cited by examiner

Both membranes were run under identical conditions

POLYMERS FOR USE AS ANION EXCHANGE MEMBRANES

FIELD OF THE INVENTION

The present invention generally relates to the field of anion exchange membranes (AEMs). In particular, the present invention is directed to polymers for use as an anion exchange membranes.

BACKGROUND

Anion Exchange Membranes (AEMs) are semi-permeable membranes that facilitate the selective transport of anions, typically hydroxide ions ($OH^-$), while blocking the passage of cations. AEMs generally consist of a polymeric backbone functionalized with positively charged groups that enable anion conduction through electrostatic interactions. In traditional polyaromatic AEMs, cations such as piperidinium are typically introduced either by direct attachment to the aromatic rings or by incorporating fluorinated groups like trifluoromethyl ($CF_3$). These approaches increase synthetic complexity, may require environmentally regulated fluorinated materials, and can reduce chemical stability. Additionally, polymer systems using piperidone monomers often adopt strained, non-ideal conformations that promote chemical degradation, lower ionic conductivity, and compromise long-term durability under alkaline conditions.

SUMMARY OF THE DISCLOSURE

In an aspect, a polymer comprising a reaction product of a polymerization mixture, including: a multinuclear aromatic compound having a formula:

(1)

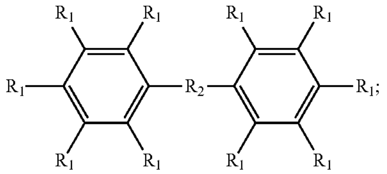

and a cyclic-amine-functionalized acetal or ketal having a formula:

(2)

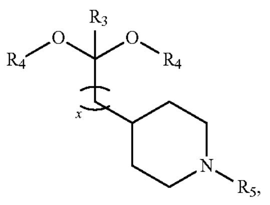

or an amine-functionalized acetal or ketal having a formula:

(3)

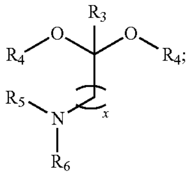

and optionally, a comonomer having a formula in any of a following groups: wherein:

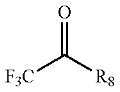

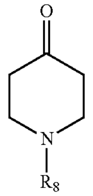

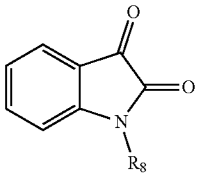

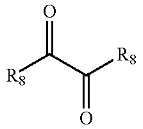

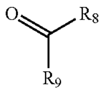

R1 is each independently alkyl, aromatic, heteroaromatic, or hydrogen;

R2 is nothing, methylene, alkyl, aromatic, heteroaromatic, amino, sulfide, sulfonyl, or ether linkages;

R3 is hydrogen or methyl or trifluoromethyl;

R4 is alkyl, or covalently linked to R4 to form a ring;

R5 is each independently hydrogen, alky, cyclic alkyl;

R6 is each independently hydrogen, alky, cyclic alkyl or covalently linked to R5 to form a ring;

R8 is hydrogen, alkyl, cyclic alkyl, aromatic, heteroaromatic;

R9 is heteroaromatic; and x is an integer from 0 to 6.

In another aspect, an anion exchange polymer including: a first repeating unit of formula one:

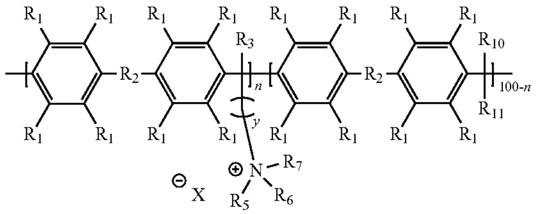

or, a second repeating unit of formula two:

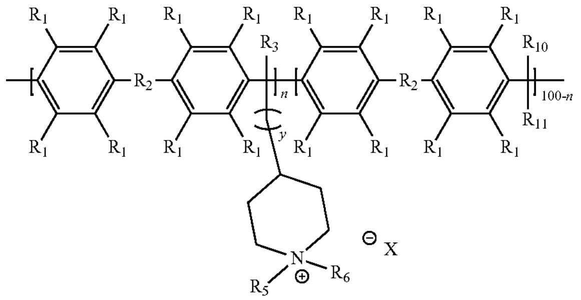

wherein:

- R1 is each independently alkyl, aromatic, heteroaromatic, polycyclic aromatic, or hydrogen;
- R2 is nothing, methylene, alkyl, aromatic, heteroaromatic, polycyclic aromatic, amino, sulfide, sulfonyl, or ether linkages;
- R3 is hydrogen or methyl, or trifluoromethyl;
- R5 is hydrogen, $C_1$-$C_{20}$ alkyl, and $C_5$-$C_{10}$ cycloalkyl;
- R6 is hydrogen, $C_1$-$C_{20}$ alkyl, and $C_5$-$C_{10}$ cycloalkyl, or covalently linked to R5 to form a ring;
- R7 is hydrogen, $C_1$-$C_{20}$ alkyl, and $C_5$-$C_{10}$ cycloalkyl;
- R10 is each independently derived from polymerization products of comonomer;
- R11 is each independently derived from polymerization products of comonomer;
- y is an integer from 0 to 6, and optionally comprises a linear, branched, or cyclic hydrocarbons;
- n is an integer corresponding to 1 to 100 mole % of a total repeating units in the polymer; and
- $X^-$ is an anion.

A method of making a polymer as described above is provided, the method including: reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer; precipitating the amine-functionalized acetal or ketal intermediate polymer using aqueous solvent to form a solid amine-functionalized acetal or ketal intermediate polymer; dissolving the solid amine-functionalized acetal or ketal intermediate polymer in second solvent; alkylating the amine-functionalized acetal or ketal intermediate polymer using an alkylating agent in the presence of a second solvent to form quaternized-amine-functionalized acetal or ketal intermediate polymer; and reacting the quaternized-amine-functionalized acetal or ketal intermediate polymer with salt to form the polymer.

A method of making an hydroxide exchange polymer membrane including an hydroxide exchange polymer as described above is also provided, the method including: reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer; precipitating the amine-functionalized acetal or ketal intermediate polymer using precipitation solvent to form a solid amine-functionalized acetal or ketal intermediate polymer; dissolving the solid amine-functionalized acetal or ketal intermediate polymer in second solvent; alkylating the amine-functionalized acetal or ketal intermediate polymer using an alkylating agent in the presence of a second solvent to form quaternized-amine-functionalized acetal or ketal intermediate polymer; reacting the quaternized-amine-functionalized acetal or ketal intermediate polymer with salt to form a polymer solution; precipitating a quaternized-amine-functionalized acetal or ketal functionalized polymer from the polymer solution using precipitation solvent to a dried polymer powder; and casting a final polymer product solution to form an anion exchange polymer membrane.

An anion exchange membrane is provided which is configured and sized to be suitable for use in a fuel cell, water electrolyzer, $CO_2$ electrolyzer, redox flow batteries, electrodialysis, reverse electrodialysis, hydrogen pump, batteries and includes a polymer as described above.

An anion exchange membrane suitable for use in fuel cell, water electrolyzer, $CO_2$ electrolyzer, redox flow batteries, electrodialysis, reverse electrodialysis, hydrogen pump, batteries is provided which includes a polymer as described above.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
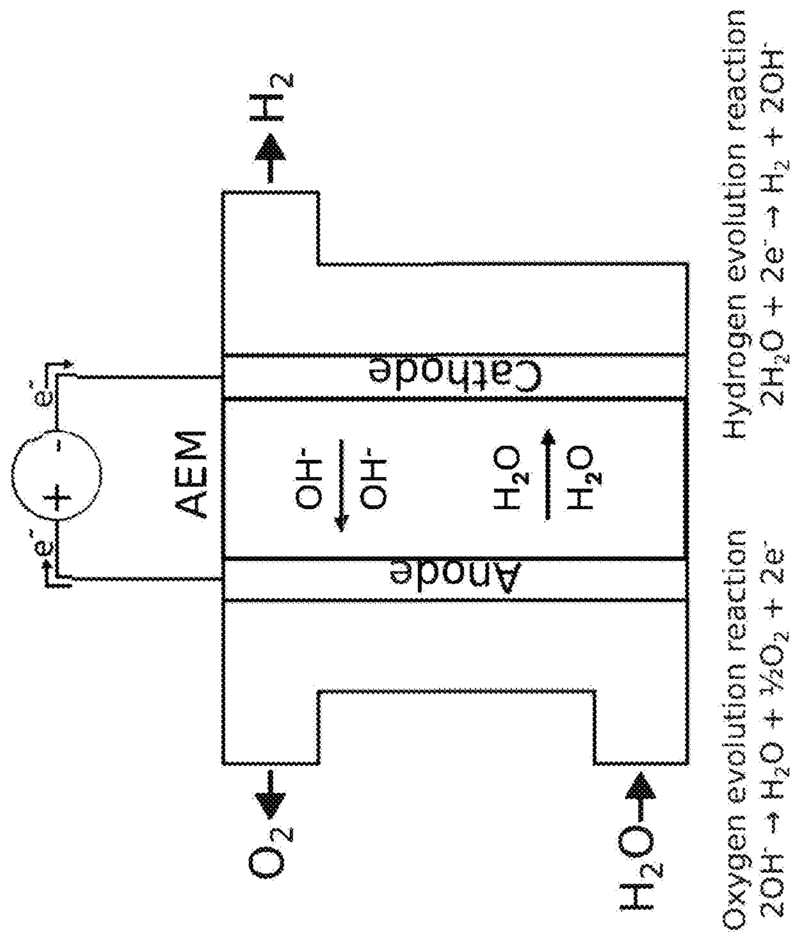
FIG. 1 is an exemplary embodiment of a water electrolyzer.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to polymers for use as an AEM and produce an alkaline stable AEM. The multinuclear aromatic and amine-functionalized acetal (ketal) come together to form a polymer with a hydrocarbon backbone that is stable to alkaline conditions. The use of an amine-functionalized acetal allows for the incorporation of a stable cation, dimethyl piperidinium, in the most stable confirmation while avoiding incorporation of a $CF_3$ group with every cation. The amines within the amine-functionalized polyaromatic that results from this polymerization are quaternized to form the desired cationic groups to create an AEM that is mechanically robust, conductive, and stable.

AEMs and/or Hydroxide Exchange Ionomers (HEIs) formed from polymers having continuous ion-conducting pathways specifically designed for hydroxide ($OH^-$) transport have been discovered. The polymers simultaneously provide improved chemical stability, superior performance, conductivity, water update, mechanical properties, and other attributes relevant to AEMs/HEIs performance. The polymer incorporates the use of amine-functionalized acetal or amine-functionalized ketal which allows for the incorporation of an amine group with carbon spacers between the aromatic backbone and without requiring the use of fluorinated compounds, which is of particular interest in the case of a PFAS ban. A dimethyl piperidinium cation structure, which has been shown to be stable in high pH conditions, is of particular interest for incorporation into polyaromatics. Importantly, the piperidinium cation in this invention has a carbon spacer that separates the ring structure from the backbone. This imparts greater chemical stability compared to other AEMs which commonly use piperidone monomers. These AEMs/HEIs exhibit enhanced chemical stability, hydroxide conductivity, controlled water uptake, favorable solubility in selected solvents, and improved mechanical properties under dry ambient conditions compared to conventional AEM/HEIs. Membrane electrode assemblies (MEAs) fabricated from these materials demonstrate improved performance and durability under elevated temperature operating conditions.

A polymer is provided which includes a reaction product of a polymerization mixture including (i) a cyclic-amine-functionalized acetal or ketal or an amine-functionalized acetal or ketal, (ii) a multinuclear aromatic compound, and (iii) optionally, a comonomer. This polymer is referred to herein as amine-functionalized acetal (ketal) polymer.

The multinuclear aromatic compound has the formula:

(1)

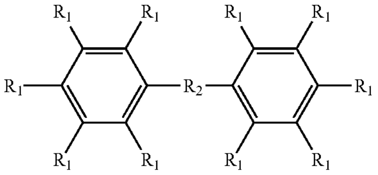

wherein R1 is alkyl, aromatic, heteroaromatic, polycyclic aromatic, or hydrogen. R2 is nothing, methylene, alkyl, aromatic, heteroaromatic, polycyclic aromatic, amino, sulfide, sulfonyl, or ether linkages. The aromatic, heteroaromatic or polycyclic aromatic groups of R1 and/or R2 may include one or more fused ring structures including naphthalene, anthracene, fluorene, carbazole, dibenzothiophene, and derivatives thereof. The multinuclear aromatic compound may include biphenyl, propane-2,2-diyldibenzene, diphenylmethane, diphenylsulfane, terphenyl, sulfonyldibenzene, oxydibenzene.

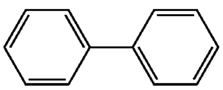

biphenyl

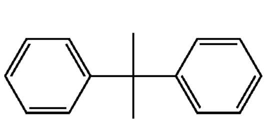

propane-2,2-diyldibenzene

-continued

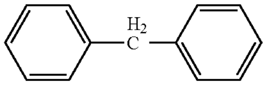

diphenylmethane

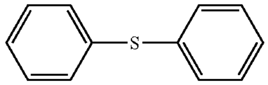

diphenylsulfane

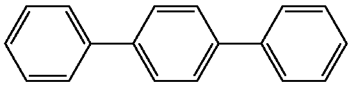

terphenyl

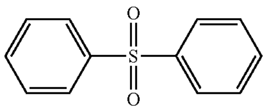

sulfonyldibenzene

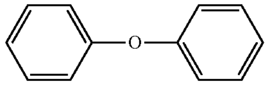

oxydibenzene

The cyclic-amine-functionalized acetal or ketal has the formula:

(2)

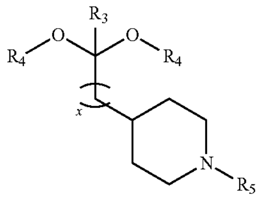

wherein R3 is hydrogen, methyl, or trifluoromethyl. "X" is an integer from 0 to 6. R4 is alkyl or covalently linked to R4 to form a ring; R5 is each independently hydrogen, alky, cyclic alkyl. The cyclic-amine-functionalized acetal or ketal may include 4-(2,2-diethoxyethyl)piperidine, 4-(2,2-diethoxypropyl)piperidine, 4-(dimethoxy methyl)piperidine, 4-(1,3-dioxolan-2-yl)-1-methylpiperidine, 4-(dimethoxymethyl)-1,1-dimethylpiperidin-1-ium, 3-(dimethoxymethyl)-6-azaspiro[5.5]undecan-6-ium.

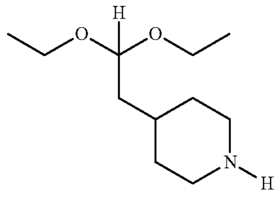

4-(2,2-diethoxyethyl)piperidine

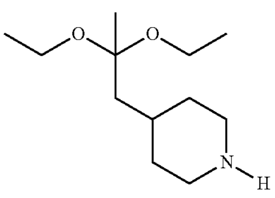

4-(2,2-diethoxypropyl)piperidine

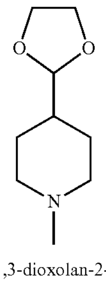

4-(1,3-dioxolan-2-yl)-1-methylpiperidine

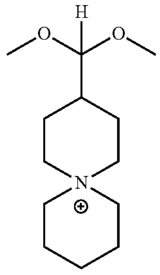

3-(dimethoxymethyl)-6-azaspiro[5.5]undecan-6-ium

-continued

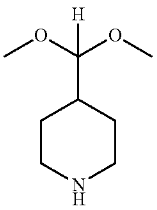

4-(dimethoxymethyl)piperidine

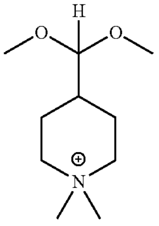

4-(dimethoxymethyl)-1,1-dimethylpiperidine-1-ium

A polymer may also include a reaction product of quaternized cyclic-amine-functionalized acetal or ketal monomer:

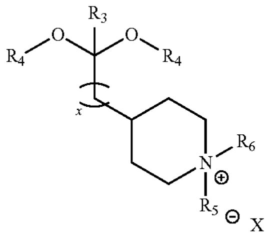

wherein R3 is hydrogen, methyl, or trifluoromethyl. "X" is an integer from 0 to 6. R4 is alkyl or covalently linked to R4 to form a ring. R5 is each independently hydrogen, alky, cyclic alkyl. R6 is each independently hydrogen, alky, cyclic alkyl or covalently linked to R5 to form a ring. "$X^-$" is an anion. An anion may include fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluene sulfonate (tosylate), nitrite, chlorate, bromate, iodate, or bis(trifluoromethanesulfonyl)imide (bistriflimide).

The amine-functionalized acetal or ketal has the formula:

(3)

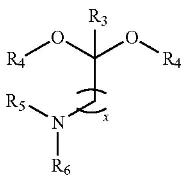

wherein R3 is hydrogen, methyl, or trifluoromethyl. "X" is an integer from 0 to 6. R4 is alkyl or covalently linked to R4 to form a ring. R5 is each independently hydrogen, alky, cyclic alkyl. R6 is each independently hydrogen, alky, cyclic alkyl or covalently linked to R5 to form a ring. The amine-functionalized acetal or ketal may include 2,2-diethoxyethan-1-amine,2,2-diethoxypropan-1-amine, 2,2-diethoxy-N-methylpropan-1-amine, 2,2-diethoxy-N-methylethan-1-amine, 2,2-diethoxy-N,N-dimethylpropan-1-amine, 2,2-diethoxy-N,N-dimethylethan-1-amine, 3,3-diethoxypropan-1-amine, 4,4-diethoxybutan-1-amine, 4,4-diethoxy-N,N,N-trimethylbutan-1-aminium.

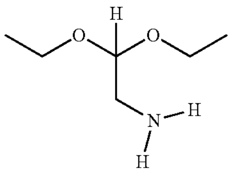

2,2-diethoxyethan-1-amine

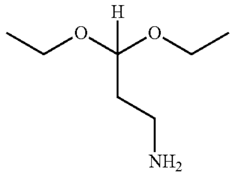

3,3-diethoxypropan-1-amine

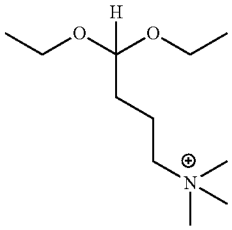

4,4-diethoxy-N,N,N-trimethylbutan-1-aminium

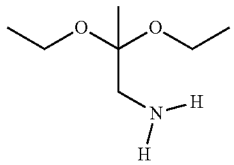

2,2-diethoxypropan-1-amine

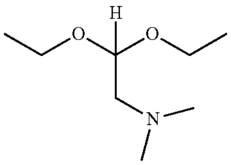

2,2-diethoxy-N,N-dimethylethan-1-amine

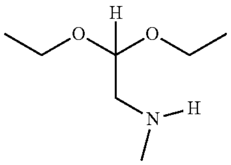

2,2-diethoxy-N-methylethan-1-amine

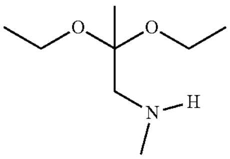

2,2-diethoxy-N-methylpropan-1-amine

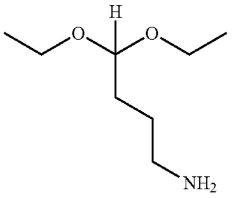

4,4-diethoxybutan-1-amine

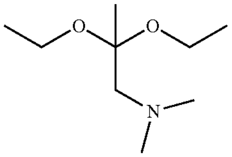

2,2-diethoxy-N,N-dimethylpropan-1-amine

The polymer may also include a reaction product of quaternized amine-functionalized acetal or keta monomer:

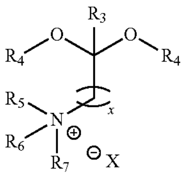

wherein R3 is hydrogen, methyl, or trifluoromethyl. "X" is an integer from 0 to 6. R4 is alkyl or covalently linked to R4 to form a ring. R5 is each independently hydrogen, alky, cyclic alkyl. R6 is each independently hydrogen, alky, cyclic alkyl or covalently linked to R5 to form a ring. R7 is hydrogen, $C_1$-$C_{20}$ alkyl, and $C_5$-$C_{10}$ cycloalkyl. "$X^-$" is an anion. An anion may include fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluene sulfonate (tosylate), nitrite, chlorate, bromate, iodate, or bis(trifluoromethanesulfonyl)imide (bistriflimide). The a comonomer having a formula

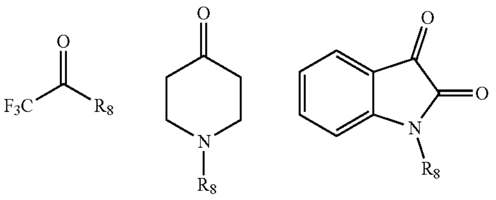

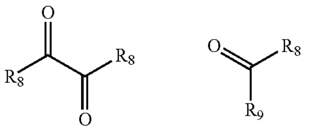

in any of a following groups:

wherein R8 is hydrogen, alkyl, cyclic alkyl, aromatic, heteroaromatic; R9 is heteroaromatic. The comonomer may include electron deficient ketone or aldehyde compounds.

The comonomer may include but not limited to trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde.

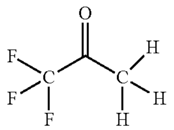

trifluoroacetone

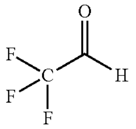

trifluoroacetaldehyde

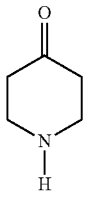

piperidin-4-one

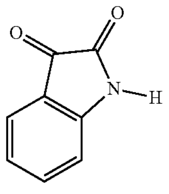

indoline-2, 3-dione

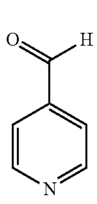

isonicotinaldehyde

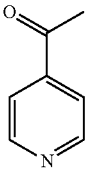

1-(pyridin-4-yl) ethan-1-one

-continued

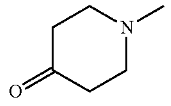

1-methylpiperidin -4-one

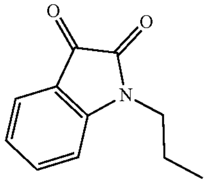

1-propylindoline -2, 3-dione

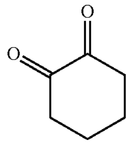

cyclohexane-1, 2-dione

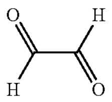

oxalaldehyde

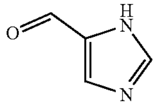

1H-imidazole-5-carbaldehyde

A polymer is provided which includes a reaction product of an alkylating agent and the polymer including the reaction product of the polymerization mixture including the cyclic-amine-functionalized acetal or ketal. This polymer is referred to herein as a cyclic-amine-functionalized acetal (ketal) polymer.

A polymer is provided which includes a reaction product of an alkylating agent and the polymer including the reaction product of the polymerization mixture including the amine-functionalized acetal or ketal. This polymer is referred to herein as a amine-functionalized acetal (ketal) polymer.

A polymer includes a reaction product of salt and the polymer. The salt may include but is not limited to fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methanesulfonate, trifluoromethanesulfonate, p-toluenesulfonate, nitrite, chlorate, bromate, iodate, or bis(trifluoromethanesulfonyl)imide.

The polymer can also be an anion exchange polymer which includes a first repeating unit or a second repeating unit.

The first repeating unit has a formula:

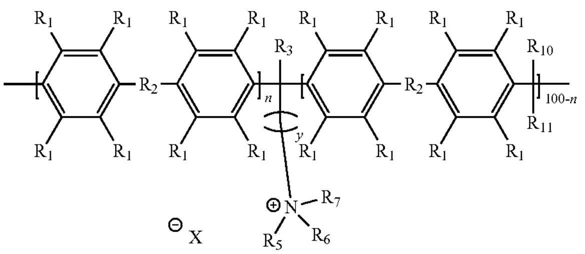

wherein R1 is each independently alkyl, aromatic, heteroaromatic, polycyclic aromatic, or hydrogen; R2 is nothing, methylene, alkyl, aromatic, heteroaromatic, polycyclic aromatic, amino, sulfide, sulfonyl, or ether linkages; R3 is hydrogen or methyl, or trifluoromethyl; R5 is hydrogen, $C_1$-$C_{20}$ alkyl, and $C_5$-$C_{10}$ cycloalkyl; R6 is hydrogen, $C_1$-$C_{20}$ alkyl, and $C_5$-$C_{10}$ cycloalkyl, or covalently linked to R5 to form a ring; R7 is hydrogen, $C_1$-$C_{20}$ alkyl, and $C_5$-$C_{10}$ cycloalkyl. R10 is each independently derived from polymerization products of comonomer, wherein the comonomer comprises electron deficient ketone or aldehyde compounds; R11 is each independently derived from polymerization products of comonomer, wherein the comonomer comprises electron deficient ketone or aldehyde compounds. A comonomer may include trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde; y is an integer from 0 to 6, and optionally includes a linear, branched, or cyclic hydrocarbons; n is an integer corresponding to 1 to 100 mole % of a total repeating units in the polymer; and $X^-$ is an anion. An anion may include fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluene sulfonate (tosylate), nitrite, chlorate, bromate, iodate, or bis(trifluoromethanesulfonyl)imide (bistriflimide).

The second repeating unit has a formula:

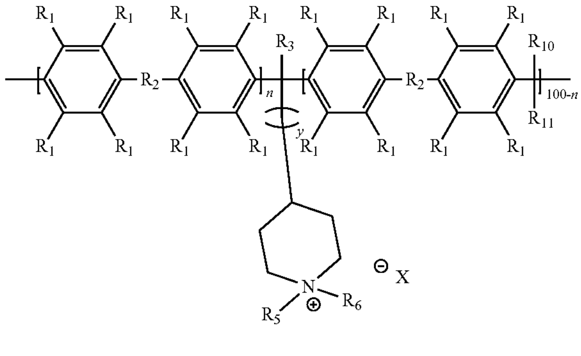

wherein R1 is each independently alkyl, aromatic, heteroaromatic, polycyclic aromatic or hydrogen; R2 is nothing, methylene, alkyl, aromatic, heteroaromatic, polycyclic aromatic, amino, sulfide, sulfonyl, or ether linkages. R3 is hydrogen or methyl, or trifluoromethyl; R5 is hydrogen, $C_1$-$C_{20}$ alkyl, and $C_5$-$C_{10}$ cycloalkyl; R6 is hydrogen, $C_1$-$C_{20}$ alkyl, and $C_5$-$C_{10}$ cycloalkyl, or covalently linked to R5 to form a ring; R10 is each independently derived from polymerization products of comonomer, wherein the comonomer comprises electron deficient ketone or aldehyde compounds; R11 is each independently derived from polymerization products of comonomer, wherein the comonomer comprises electron deficient ketone or aldehyde compounds. A comonomer may include trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde. y is an integer from 0 to 6, and optionally includes a linear, branched, or cyclic hydrocarbons; n is an integer corresponding to 1 to 100 mole % of a total repeating units in the polymer; and $X^-$ is an anion. An anion may include fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluenesulfonate (tosylate), nitrite, chlorate, bromate, iodate, or bis(trifluoromethanesulfonyl)imide (bistriflimide).

The polymer may be a prepolymer which includes a first repeating unit or a second repeating unit. The first repeating unit of a prepolymer has a formula:

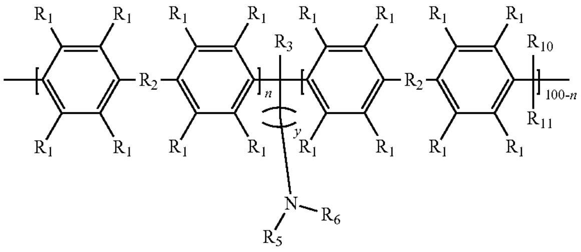

wherein R1 is each independently alkyl, aromatic, heteroaromatic, polycyclic aromatic or hydrogen; R2 is nothing, methylene, alkyl, aromatic, heteroaromatic, polycyclic aromatic, amino, sulfide, sulfonyl, or ether linkages; R3 is hydrogen or methyl, or trifluoromethyl; R5 is hydrogen, $C_1$-$C_{20}$ alkyl, and $C_5$-$C_{10}$ cycloalkyl; R6 is hydrogen, $C_1$-$C_{20}$ alkyl, and $C_5$-$C_{10}$ cycloalkyl, or covalently linked to R5 to form a ring; R10 is each independently derived from polymerization products of comonomer, wherein the comonomer comprises electron deficient ketone or aldehyde compounds. R11 is each independently derived from polymerization products of comonomer, wherein the comonomer comprises electron deficient ketone or aldehyde compounds. A comonomer may include trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde. Y is an integer from 0 to 6, and optionally includes a linear, branched, or cyclic hydrocarbons; n is an integer corresponding to 1 to 100 mole % of a total repeating units in the polymer.

In an unlimiting embodiment example, a polymer with one or more spiro bicyclic compound where R5 and R6 are covalently connected has a formula:

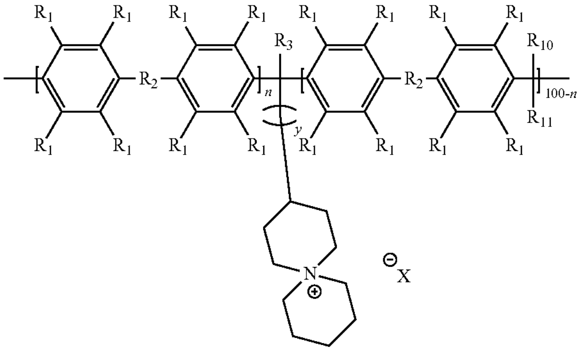

wherein R1 is each independently alkyl, aromatic, heteroaromatic, polycyclic aromatic or hydrogen; R2 is nothing, methylene, alkyl, aromatic, heteroaromatic, polycyclic aromatic, amino, sulfide, sulfonyl, or ether linkages; R3 is hydrogen, or methyl or trifluoromethyl; R10 is each independently derived from polymerization products of comonomer, wherein the comonomer comprises electron deficient ketone or aldehyde compounds; R11 is each independently derived from polymerization products of comonomer, wherein the comonomer comprises electron deficient ketone or aldehyde compounds. A comonomer may include trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde; y is an integer from 0 to 6, and optionally includes a linear, branched, or cyclic hydrocarbons; n is an integer corresponding to 1 to 100 mole % of a total repeating units in the polymer; and $X^-$ is an anion. An anion may include fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluenesulfonate (tosylate), nitrite, chlorate, bromate, iodate, or bis(trifluoromethanesulfonyl)imide (bistriflimide).

The second repeating unit of a prepolymer has a formula:

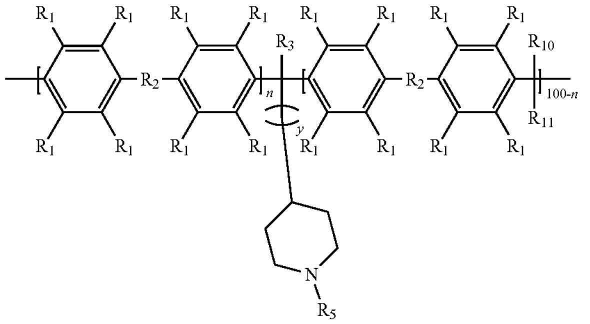

wherein R1 is each independently alkyl, aromatic, heteroaromatic, polycyclic aromatic or hydrogen; R2 is nothing, methylene, alkyl, aromatic, heteroaromatic, polycyclic aromatic, amino, sulfide, sulfonyl, or ether linkages; R3 is hydrogen or methyl, or trifluoromethyl. R5 is hydrogen, $C_1$-$C_{20}$ alkyl, and $C_5$-$C_{10}$ cycloalkyl; R10 is each independently derived from polymerization products of comonomer, wherein the comonomer comprises electron deficient ketone or aldehyde compounds; R11 is each independently derived from polymerization products of comonomer, wherein the comonomer comprises electron deficient ketone or aldehyde compounds; A comonomer may include trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde; y is an integer from 0 to 6, and optionally includes a linear, branched, or cyclic hydrocarbons; n is an integer corresponding to 1 to 100% of a total repeating units in the polymer.

The polymer can be prepared by a method which includes reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer; precipitating the amine-functionalized acetal or ketal intermediate polymer using aqueous solvent to form a solid amine-functionalized acetal or ketal intermediate polymer; dissolving the solid amine-functionalized acetal or ketal intermediate polymer in second solvent; alkylating the amine-functionalized acetal or ketal intermediate polymer using an alkylating agent in the presence of a second solvent to form quaternized-amine-functionalized acetal or ketal intermediate polymer; and reacting the quaternized-amine-functionalized acetal or ketal intermediate polymer with salt to form the polymer.

For example, a multinuclear aromatic compound such as biphenyl, propane-2,2-diyldibenzene, diphenylmethane, diphenylsulfane, sulfonyldibenzene, oxydibenzene, p-terphenyl and an comonomer such as trifluoroacetone, trifluoroacetaldehyde, piperidin-4-one, indoline-2,3-dione, isonicotinaldehyde, oxalaldehyde, 1-methylpiperidin-4-one, 1-(pyridin-4-yl)ethan-1-one, cyclohexane-1,2-dione, 1H-imidazole-5-carbaldehyde, 1-propylindoline-2,3-dione can be placed in a stirred container and dissolved into a first solvent. The first solvent may include dichloromethane, chloroform, 1,2-dichloroethane, tetrachloroethane. A polymerization catalyst in a solvent can be added. The polymerization catalyst may include trifluoromethanesulfonic acid, fluorosulfuric acid, and magic acid, fluoroantimonic acid, methanesulfonic acid, fluoroboric acid, and bistriflimidic acid. A cyclic-amine-functionalized acetal such as 4-(dimethoxymethyl)piperidine can then be added dropwise based on reaction temperature at −78° C. to 80° C. A preferred addition temperature is 10° C.

Thereafter, the reaction continues at this temperature for about 1 to 120 hours. A preferred reaction temperature is 3 hours. Reaction time may be dependent on solution viscosity. The resulting solution is poured slowly into a precipitation solvent to form a solid amine-functionalized acetal or ketal intermediate polymer. The precipitation solvent may include water, methanol, hexane, chloroform, tetrahydrofuran, isopropanol, ethanol, acetone, and mixtures thereof.

The solid amine-functionalized acetal or ketal intermediate polymer obtained is dissolved in a second solvent at 0° C. to 100° C. temperature for about 1 to 48 hours. A preferred temperature is ambient temperature. The second solvent may include tetrahydrofuran, dichloromethane, chloroform, N'N-dimethylformamide, dimethyl sulfoxide, N-methyl pyrrolidone, N-methyl pyrrolidone, N,N-dimethylacetamide, or acetonitrile.

The dissolved amine-functionalized acetal or ketal intermediate polymer is in a stirred container. An alkylating agent is added, and salt. A salt may include potassium carbonate, sodium hydroxide, and potassium hydroxide. The solution is stirred over about 4 to 48 hours at 20° C. to 100° C. A preferred temperature is 40° C. The alkylating agent may include methyl iodide, iodoethane, 1-iodopropane, 1-iodobutane, 1-iodopentane, 1-iodohexane, methyl bromide, ethyl bromide, n-propyl bromide, n-butyl bromide, 1-bromopentane, 1-bromohexane, methyl chloride, ethyl chloride, n-propyl chloride, n-butyl chloride, 1-chloropentane, 1-chlorohexane or a combination thereof. The resulting solution forms quaternized-amine-functionalized acetal or ketal intermediate polymer.

The amine-functionalized acetal or ketal intermediate polymer is then subjected to a salt treatment for anion exchange. For example, and without limitation, a salt may include 1 M potassium hydroxide (KOH) for hydroxide ion exchange, typically performed after the polymer has been formed into a membrane. The exchange may be conducted at a temperature of about 20° C. to 100° C. for a duration of approximately 12 to 48 hours, followed by thorough washing and immersion in deionized water for an additional 12 to 48 hours under an oxygen-free atmosphere to remove residual KOH. In one or more embodiments, additional salt forms such as sodium hydroxide may be used. In one or more embodiments, anions such as chloride ($Cl^-$), bicarbonate ($HCO_3^-$), or acetate ($CH_3COO^-$) are desired, a corresponding salt treatment may be performed on a polymer prior to membrane formation.

The polymer can be made into anion exchange polymer membranes. The anion exchange polymer membranes can be prepared by a method which includes reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer; precipitating the amine-functionalized acetal or ketal intermediate polymer using aqueous solvent to form a solid amine-functionalized acetal or ketal intermediate polymer; dissolving the solid amine-functionalized acetal or ketal intermediate polymer in second solvent; alkylating the amine-functionalized acetal or ketal intermediate polymer using an alkylating agent in the presence of a second solvent to form quaternized-amine-functionalized acetal or ketal intermediate polymer; and reacting the quaternized-amine-functionalized acetal or ketal intermediate polymer with salt to form the polymer and casting the final polymer product solution to form an anion exchange polymer membrane.

In one or more embodiments, a final polymer product may be cast onto a substrate using various coating or deposition techniques. For example, and without limitation, casting methods may include doctor blade coating, slot die coating, bar coating, microgravure coating, or solvent casting.

In one or more embodiments, a substrate may include a surface on which a polymer solution is cast or coated during membrane fabrication. For example, and without limitation, a substrate may include polyethylene terephthalate (PET) film, onto which a polymer solution may be deposited and subsequently dried or cured; the resulting membrane may then be peeled off a substrate following solvent evaporation. In one or more embodiments, supporting materials may be incorporated into a membrane structure to enhance mechanical strength, dimensional stability, or handling characteristics. For example, and without limitation, supporting materials may include porous meshes, woven or non-woven textiles, expanded plastics, or porous films. In one embodiment, a supporting material may include expanded polytetrafluoroethylene (ePTFE). In another embodiment, a supporting material may include expanded polyethylene (ePE). Additional supporting materials may include polypropylene meshes, polyester fabrics, or glass fiber cloths. In one or more embodiments, an anion exchange membrane may be prepared by in a presence of a polymerization catalyst. A "polymerization catalyst," as used in this disclosure, is a chemical species that initiates and/or accelerates a polymerization reaction. In one or more embodiments, a polymerization catalyst may enable a formation of polymer chains from monomer unites. In one or more embodiments, a polymerization catalyst may include superacids. In an embodiments, superacids may include acids that are significantly stronger than 100% sulfuric acid. In one or more embodiments, superacids used in polymerization reactions as a polymerization catalyst may enable electrophilic aromatic substitution reaction, which may facilitate a formation of high-molecular-weight, ether-free, fully aromatic polymer backbones. In one or more embodiments, an electrophilic aromatic substitution reaction may involve a hydrogen atom on an aromatic ring that is replaced by an electrophile, which results in an introduction of various functional groups into aromatic rings. In one or more embodiments, superacids may catalyze a polymerization by acting as strong proton doners, generating highly reaction carbocations that may initiate propagate condensation reactions between aromatic monomers including a multinuclear aromatic compound. A polymerization catalyst may include trifluoromethanesulfonic acid, fluorosulfuric acid, and magic acid, fluoroantimonic acid, methanesulfonic acid, fluoroboric acid, bistriflimidic acid.

In one or more embodiments, an anion exchange membrane may be prepared in a presence of an alkylating agent. An "alkylating agent," as used in this disclosure, is a chemical compound capable of transferring an alkyl group to another molecule. In one or more embodiments, an alkylating agent may introduce cationic groups onto a polymer backbone or side chains, which may be essential for anion conduction. In one or more embodiments, alkylation step may create polymers capable of exchanging halide for hydroxide, enabling anion ($OH^-$) conduction. An alkylating agent may include methyl iodide, iodoethane, 1-iodopropane, 1-iodobutane, 1-iodopentane, 1-iodohexane, methyl bromide, ethyl bromide, n-propyl bromide, n-butyl bromide, 1-bromopentane, 1-bromohexane, methyl chloride, ethyl chloride, n-propyl chloride, n-butyl chloride, 1-chloropentane, 1-chlorohexane or a combination thereof.

In one or more embodiments, an anion exchange membrane may be prepared by in a presence of a first solvent. In one more embodiments, a first solvent may include organic solvents. In one or more embodiments, a first solvent may include polar aprotic solvents. A first solvent may include dichloromethane, chloroform, 1,2-dichloroethane, N-Methyl-2-pyrrolidone (NMP), dimethyl sulfoxide (DMSO), dimethylformamide (DMF), dimethylacetamide (DMAc), tetrahydrofuran (THF), tetrachloroethane, nitrobenzene.

In one or more embodiments, an anion-exchange membrane (AEM) may be prepared in a presence of a salt. A "salt," as used in this disclosure, is an electrically neutral compound comprising at least one cation and at least one anion arranged so that the net charge of the compound is zero. In one or more embodiments, following quaternization, a polymer backbone may bear covalently bound (fixed) cations; therefore, charge neutrality may be maintained by introducing a mobile counter-anion supplied by a salt. In one or more embodiments, a polymer precursor (e.g., in powder form) may be contacted with, or soaked in, a salt solution to introduce a counter-anion. In one or more embodiments, a polymer may be a first solution-cast to form a self-supporting AEM film, and the resulting membrane is then immersed in a salt solution to effect the desired ion-exchange or to stabilize a membrane prior to further processing. For example and without limitation, a salt may include sodium fluoride, potassium fluoride, calcium fluoride, magnesium fluoride, ammonium fluoride, sodium chloride, potassium chloride, calcium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium nitrate, potassium nitrate, calcium nitrate, magnesium nitrate, ammonium nitrate, sodium hydroxide, potassium hydroxide, calcium hydroxide, magnesium hydroxide, ammonium hydroxide, sodium hexafluoroantimonate, potassium hexafluoroantimonate, calcium hexafluoroantimonate, magnesium hexafluoroantimonate, ammonium hexafluoroantimonate, sodium hexafluorophosphate, potassium hexafluorophosphate, calcium hexafluorophosphate, magnesium hexafluorophosphate, ammonium hexafluorophosphate, sodium cyanide, potassium cyanide, calcium cyanide, magnesium cyanide, ammonium cyanide, sodium acetate, potassium acetate, calcium acetate, magnesium acetate, ammonium acetate, sodium formate, potassium formate, calcium formate, magnesium formate, ammonium formate, sodium carbonate, potassium carbonate, calcium carbonate, magnesium carbonate, ammonium carbonate, sodium bicarbonate, potassium bicarbonate, calcium bicarbonate, magnesium bicarbonate, ammonium bicarbonate, sodium sulfate, potassium sulfate, calcium sulfate, magnesium sulfate, ammonium sulfate, sodium bisulfate, potassium bisulfate, calcium bisulfate, magnesium bisulfate, ammonium bisulfate, sodium phosphate, potassium phosphate, calcium phosphate, magnesium phosphate, ammonium phosphate, sodium hydrogen phosphate, potassium hydrogen phosphate, calcium hydrogen phosphate, magnesium hydrogen phosphate, ammonium hydrogen phosphate, sodium dihydrogen phosphate, potassium dihydrogen phosphate, calcium dihydrogen phosphate, magnesium dihydrogen phosphate, ammonium dihydrogen phosphate, sodium methanesulfonate, potassium methanesulfonate, calcium methanesulfonate, magnesium methanesulfonate, ammonium methanesulfonate, sodium trifluoromethanesulfonate, potassium trifluoromethanesulfonate, calcium trifluoromethanesulfonate, magnesium trifluoromethanesulfonate, ammonium trifluoromethanesulfonate, sodium p-toluenesulfonate, potassium p-toluenesulfonate, calcium p-toluenesulfonate, magnesium p-toluenesulfonate, ammonium p-toluenesulfonate, sodium nitrite, potassium nitrite, calcium nitrite, magnesium nitrite, ammonium nitrite, sodium chlorate, potassium chlorate, calcium chlorate, magnesium chlorate, ammonium chlorate, sodium bromate, potassium bromate, calcium bromate, magnesium bromate, ammonium bromate, sodium iodate, potassium iodate, calcium iodate, magnesium iodate, ammonium iodate, sodium bis(trifluoromethanesulfonyl)imide, potassium bis(trifluoromethanesulfonyl)imide, calcium bis(trifluoromethanesulfonyl)imide, magnesium bis(trifluoromethanesulfonyl)imide, and ammonium bis(trifluoromethanesulfonyl)imide.

In one or more embodiments, an anion exchange membrane may be prepared in a presence of a precipitation solvent. A "precipitation solvent," as used in this disclosure, is a solvent that is an added to a solution containing a dissolved compound to cause that compound to form a solid precipitate of a solution. In one or more embodiments, in a synthesis of polymers for AEMs, after a polymerization or functionalization steps, a polymer solution may be added to a precipitation solvent to induce polymer precipitation. In one or more embodiments, a precipitation solvent may allow for the isolation and purification of a polymer by removing it from unreacted monomers, polymerization catalysts, and other soluble impurities. A precipitation solvent may include water, methanol, hexane, chloroform, tetrahydrofuran (THF), ethanol, acetone, diethyl ether, petroleum ether, isopropanol or mixtures thereof.

In one or more embodiments, an anion exchange membrane may be prepared in a presence of a second solvent. In one or more embodiments, a second solvent may include aprotic solvent. In one or more embodiments, a second solvent may include organic solvent. In one or more embodiments, a second solvent may be used to dissolve polymers and/or reactants for alkylation and hydroxide ion-exchange steps. A second solvent may include tetrahydrofuran, dichloromethane, chloroform, N, N-dimethylformamide, dimethyl sulfoxide chloroform, 1,1,2-trichloroethylene, benzene, toluene, chlorobenzene, and bromobenzene.

In one or more embodiments, an anion exchange membrane may be provided which may include a polymer as described above and may be configured and sized to be suitable for use in various electrochemical and energy conversion devices. For example, and without limitation, devices may include fuel cells, water electrolyzers, $CO_2$ electrolyzers, redox flow batteries, electrodialysis systems, reverse electrodialysis systems, hydrogen pumps, and batteries.

Referring now to FIG. 1, an exemplary embodiment of a water electrolyzer is illustrated. A "water electrolyzer," as used in this disclosure, is an electrochemical device that uses electrical energy to drive a non-spontaneous chemical reaction, specifically a decomposition of water into hydrogen and oxygen gas. In one or more embodiments, a water electrolyzer may include two electrodes (anode and cathode) separated by an electrolyte, such as an anion exchange membrane (AEM) incorporating any of the polymers described herein. In operation, water is introduced to the anode, where it may be oxidized to produce oxygen gas, hydroxide ions, and electrons. The electrons may travel through an external circuit to the cathode, generating an electric current, while hydroxide ions ($OH^-$) are transported through the AEM from the cathode to the anode to maintain a charge balance. At the cathode, water and electrons may react to form hydrogen gas and hydroxide ions. In one or more embodiments, an use of AEMs made from the polymers described herein may improve water electrolyzer performance by enhancing ionic conductivity and chemical stability under alkaline conditions.

With continued reference to FIG. 1, an anion exchange membranes described herein may significantly improve water electrolyzer performance. Electrolyzer efficiency may depend on reducing internal resistance, thus membranes with high ionic conductivity are preferred. Furthermore, to support high current densities for increased hydrogen production, AEMs with excellent ion-transport capacity are desirable. These membranes also need to exhibit mechanical durability and resistance to chemical degradation in the highly alkaline environment of a water electrolyzer.

Figure 2:
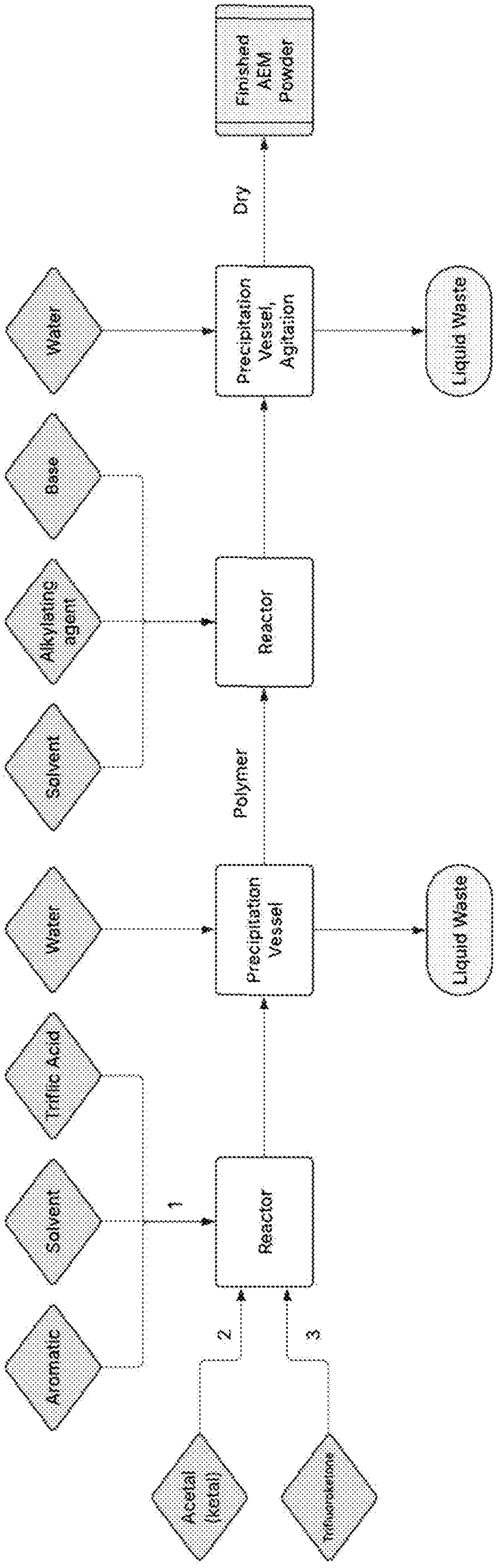
FIG. 2 is an exemplary embodiment of a polymer for anion exchange membrane preparation process.

Referring now to FIG. 2, an exemplary embodiment of a polymer for anion exchange membrane preparation process is illustrated. In one or more embodiments, a process may begin with introducing reactants into a first reactor. The reactants may include an aromatic compound, a solvent, triflic acid (or other strong acid), acetal, and 1,1,1-trifluoroacetone. In one or more embodiments, ketone may be added as optional reactants. In an embodiment, reduction of charge content of a synthesized polymer may be an improvement for further processing the synthesized polymer into AEMs. The reactor may facilitate a condensation or functionalization reaction to form an intermediate polymer solution. The resulting reaction mixture may then be transferred to a precipitation vessel, where water may be added to induce precipitation of the intermediate polymer product. In one or more embodiments, the addition of water may cause the polymer to separate as a solid phase while generating a liquid waste stream. The separated solid may then be collected and subjected to further functionalization. The solid product may be redissolved in a solvent and introduced into a second reactor along with an alkylating agent and salt. Following the second reaction, the mixture may be transferred to a precipitation vessel equipped with agitation. The functionalized polymer may be precipitated in water. The solid polymer may be separated from the resulting liquid waste, yielding a finished AEM powder suitable for membrane fabrication or other downstream applications.

Figure 3:
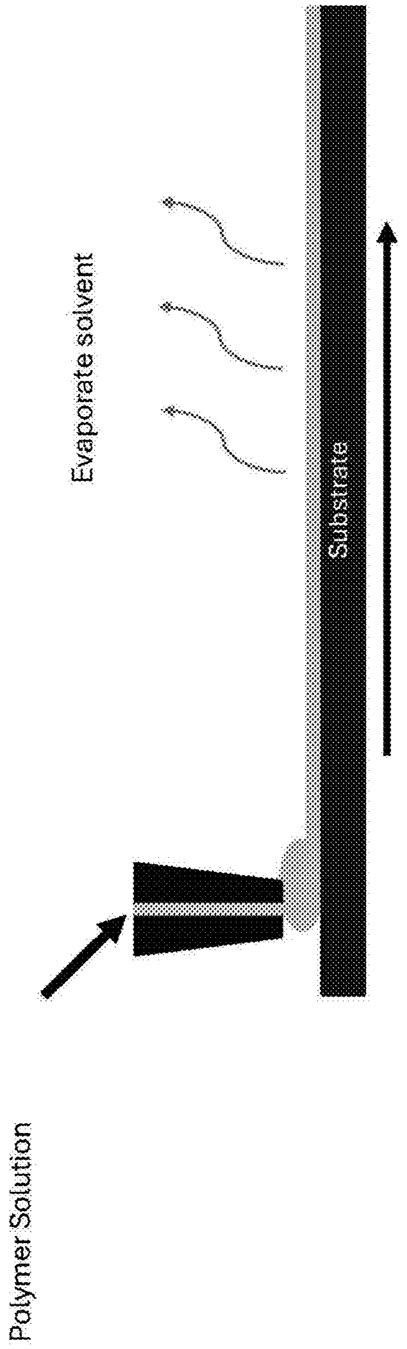
FIG. 3 is an exemplary embodiment of an AEM casting process using a polymer solution.

Referring now to FIG. 3, an exemplary embodiment of an AEM casting process using a polymer solution is illustrated. In one or more embodiments, a polymer solution may be cast on to a substrate. In one or more embodiments, casting methods may include doctor blade coating, slot die coating, bar coating, microgravure coating, or solvent casting. In one or more embodiments, a substrate may include various supporting materials to casting. For example, and without limitation, a supporting material may include porous meshes, woven or non-woven textiles, expanded plastics, porous films, polytetrafluoroethylene (ePTFE), or polyethylene (ePE). In one or more embodiments, solvent from the polymer solution may be removed through an evaporation process. In one or more embodiments, evaporation may be conducted under ambient conditions, such as at room temperature and atmospheric pressure. In one or more embodiments, evaporation may be accelerated by applying controlled heating using heating plates, infrared lamps, convection ovens, or circulating hot air to raise the temperature of a coated film. In one or more embodiments, evaporation may be performed under reduced pressure, such as in a vacuum oven or vacuum chamber. In one or more embodiments, solvent evaporation may be assisted by sweeping the film surface with an inert gas flow, such as nitrogen or argon.

Figure 4:
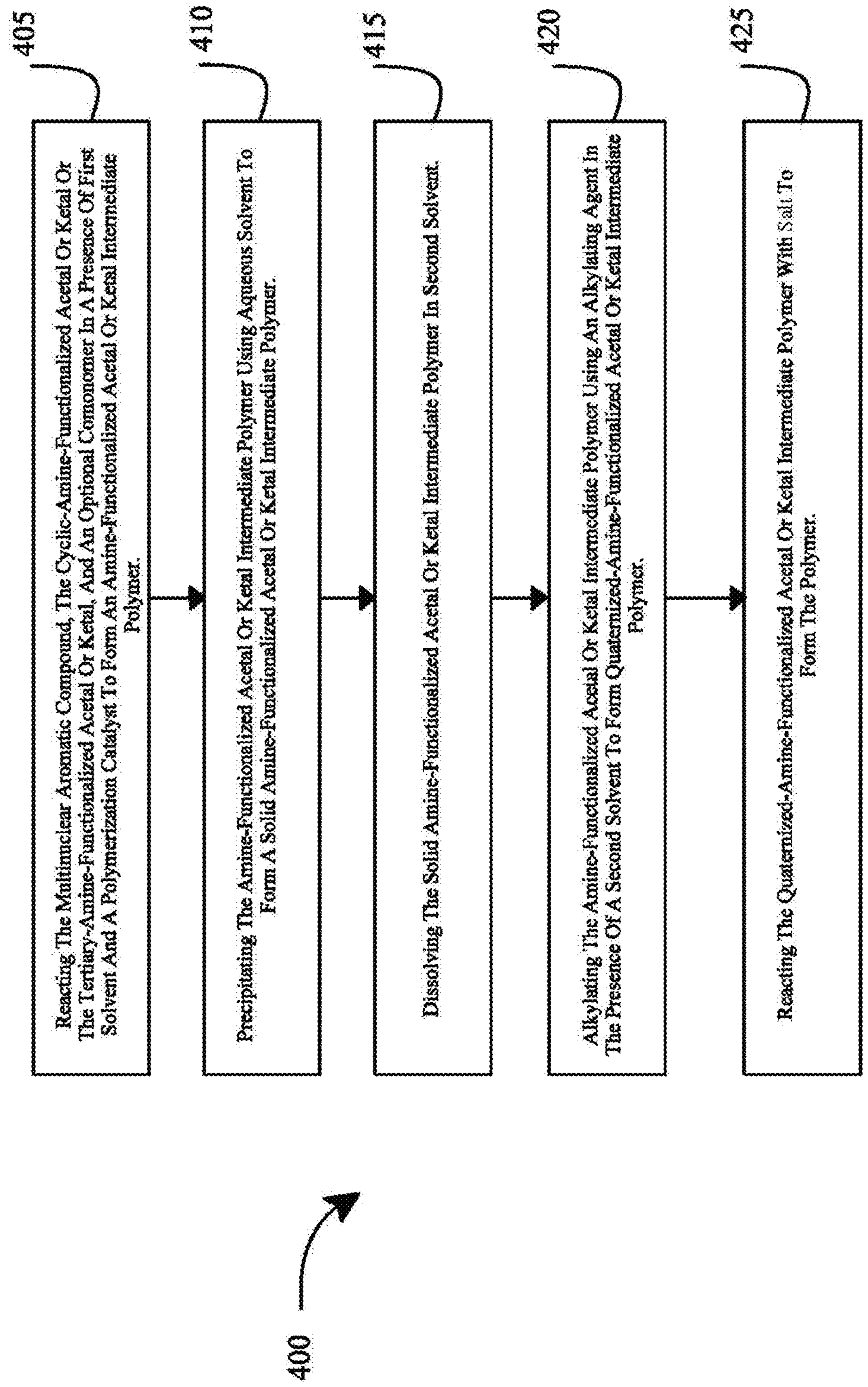
FIG. 4 is a flow diagram of an exemplary method for making a polymer.

Referring now to FIG. 4, a flow diagram of an exemplary method 400 for making a polymer is illustrated. At step 405, method 400 includes reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer. This may be implemented as described and with reference to FIGS. 1-3.

With continued reference to FIG. 4, at step 410, method 400 includes precipitating the amine-functionalized acetal or ketal intermediate polymer using aqueous solvent to form a solid amine-functionalized acetal or ketal intermediate polymer. This may be implemented as described and with reference to FIGS. 1-3.

With continued reference to FIG. 4, at step 415, method 400 includes dissolving the solid amine-functionalized acetal or ketal intermediate polymer in second solvent. This may be implemented as described and with reference to FIGS. 1-3.

With continued reference to FIG. 4, at step 420, method 400 includes alkylating the amine-functionalized acetal or ketal intermediate polymer using an alkylating agent in the presence of a second solvent to form quaternized-amine-functionalized acetal or ketal intermediate polymer. This may be implemented as described and with reference to FIGS. 1-3.

With continued reference to FIG. 4, at step 425, method 400 includes reacting to the quaternized-amine-functionalized acetal or ketal intermediate polymer with salt to form the polymer. This may be implemented as described and with reference to FIGS. 1-3.

Figure 5:
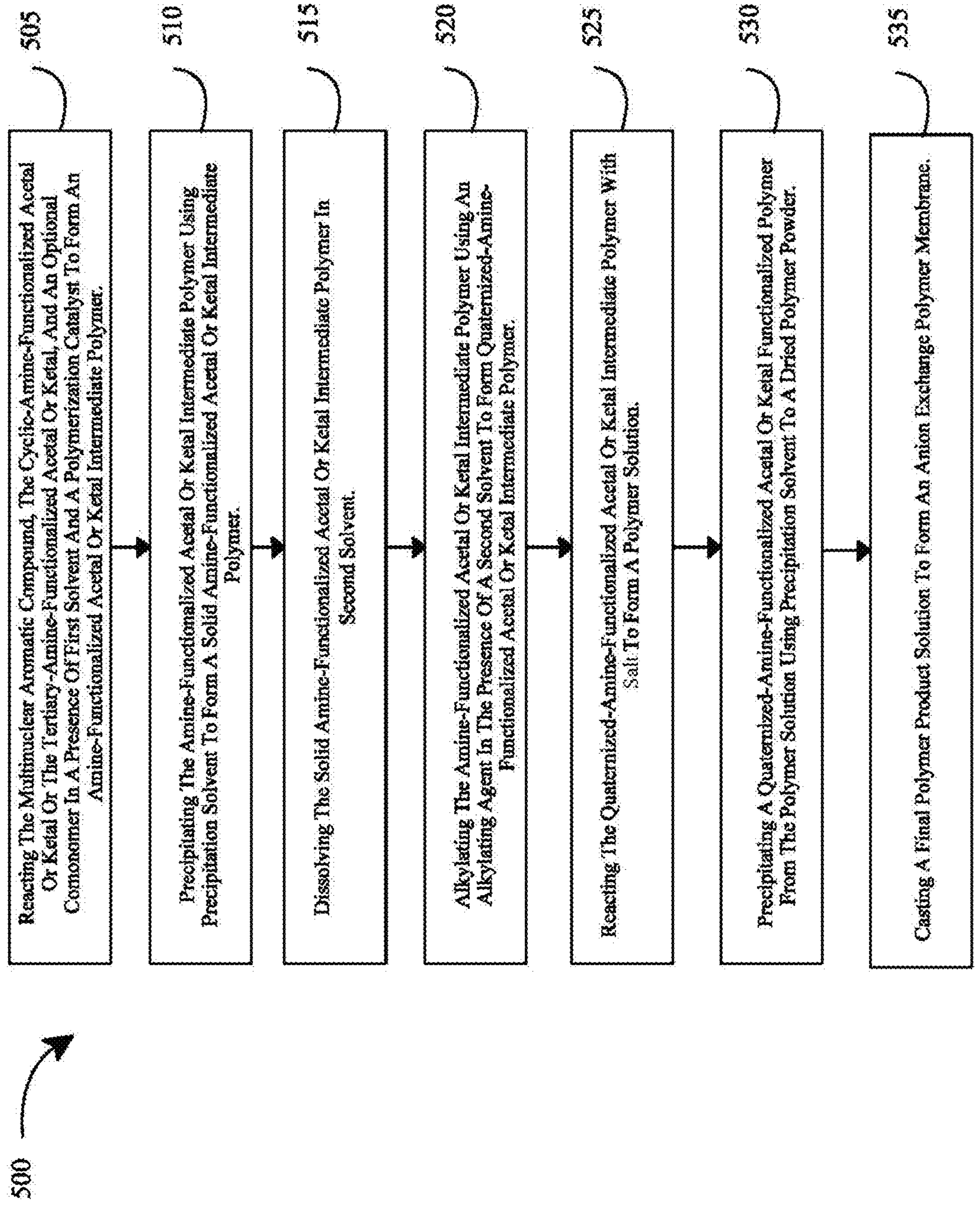
FIG. 5 is a flow diagram of an exemplary method for making an anion exchange polymer membrane including a polymer.

Referring now to FIG. 5, a flow diagram of an exemplary method 500 for making an anion exchange polymer membrane including a polymer is illustrated. At step 505, method 500 includes reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer. This may be implemented as described and with reference to FIGS. 1-3.

With continued reference to FIG. 5, at step 510, method 500 includes precipitating the amine-functionalized acetal or ketal intermediate polymer using precipitation solvent to form a solid amine-functionalized acetal or ketal intermediate polymer. This may be implemented as described and with reference to FIGS. 1-3.

With continued reference to FIG. 5, at step 515, method 500 includes dissolving the solid amine-functionalized acetal or ketal intermediate polymer in second solvent. This may be implemented as described and with reference to FIGS. 1-3.

With continued reference to FIG. 5, at step 520, method 500 includes alkylating the amine-functionalized acetal or ketal intermediate polymer using an alkylating agent in the presence of a second solvent to form quaternized-amine-functionalized acetal or ketal intermediate polymer. This may be implemented as described and with reference to FIGS. 1-3.

With continued reference to FIG. 5, at step 525, method 500 includes reacting the quaternized-amine-functionalized acetal or ketal intermediate polymer with salt to form a polymer solution. This may be implemented as described and with reference to FIGS. 1-3.

With continued reference to FIG. 5, at step 530, method 500 includes precipitating a quaternized-amine-functionalized acetal or ketal functionalized polymer from the polymer solution using precipitation solvent to a dried polymer powder. This may be implemented as described and with reference to FIGS. 1-3.

With continued reference to FIG. 5, at step 535, method 500 includes casting a final polymer product solution to form an anion exchange polymer membrane. This may be implemented as described and with reference to FIGS. 1-3.

Figure 6:
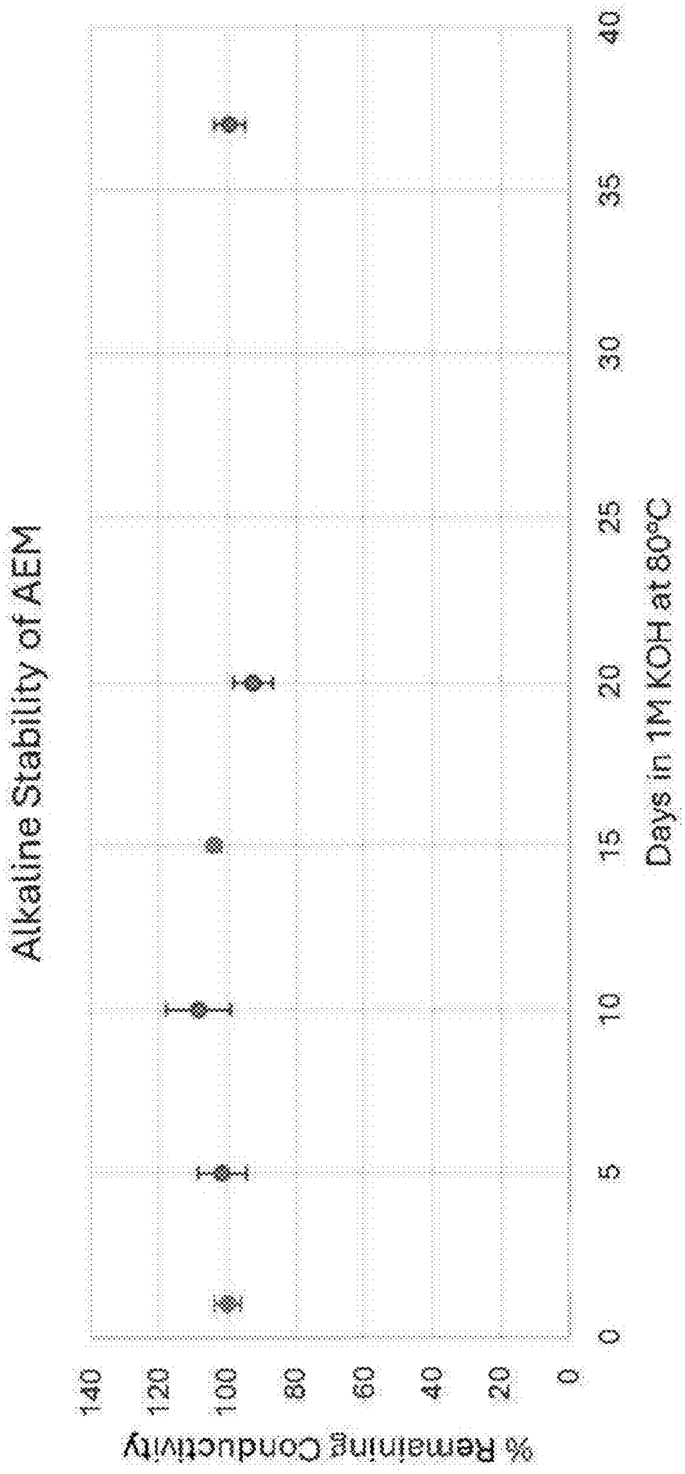
FIG. 6 is an exemplary embodiments of an AEM alkaline stability test result.

Referring now to FIG. 6, an exemplary embodiments of an AEM alkaline stability test result is illustrated. The disclosed membrane was prepared and cast from polymers as described in FIGS. 1-5. The x-axis represents the percentage of remaining conductivity, ranging from 0% to 140%. The y-axis represents the duration of membrane immersion in 1 M potassium hydroxide (KOH) at 80° C., spanning from 1 to 40 days. The AEM maintained 100% of its initial conductivity from day 0 to day 15. At day 20, the AEM conductivity decreased slightly to approximately 90%. By day 36, the AEM conductivity is approximately 100%.

Figure 7:
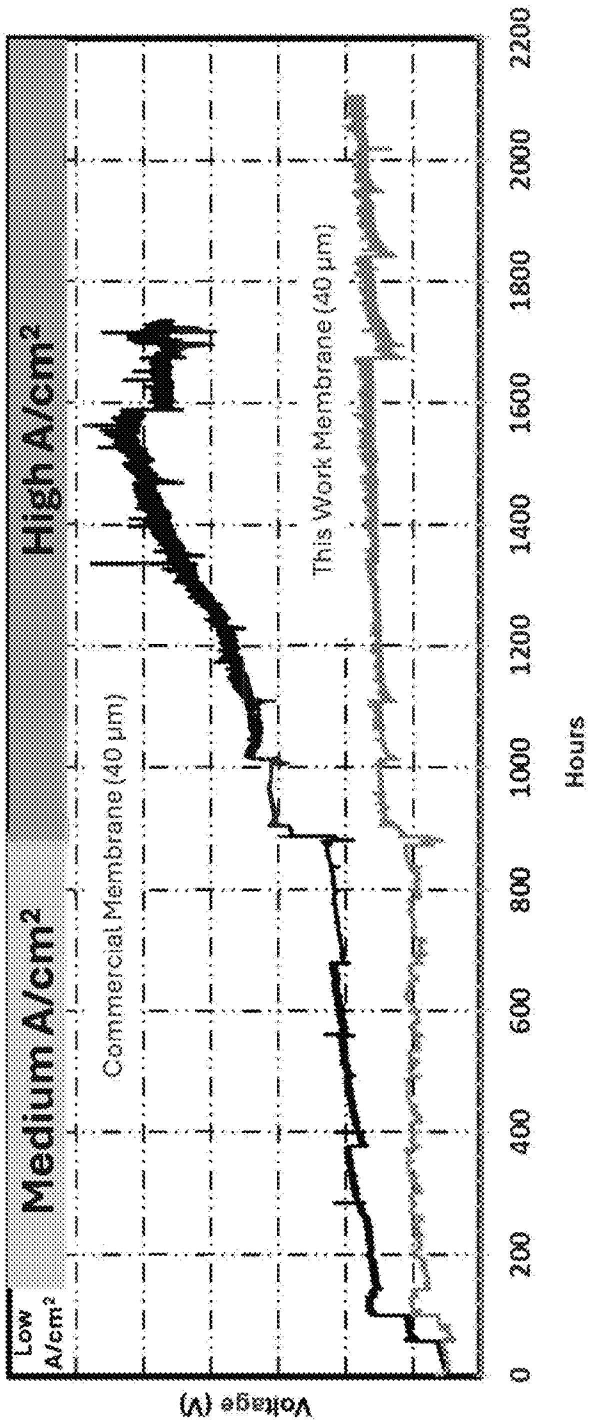
FIG. 7 an exemplary embodiment of a durability test comparing a commercial membrane and the disclosed membrane.

Referring now to FIG. 7, an exemplary embodiment of a durability test comparing a commercial membrane and the Disclosed membrane is illustrated. The durability of AEMs is typically evaluated by measuring cell voltage over time at a constant current density. The X-axis represents time, measured in hours, corresponding to the duration of the test. The Y-axis represents voltage (V). Both membranes were run under identical conditions with a membrane thickness of 40 micrometers. The testing conditions were divided into three categories of current density ($A/cm^2$): low, medium and high. Performance decay of AEMs over time results in increased resistance, which causes the voltage to rise. When the current density increases at around 890 hours in FIG. 7, there is a steep increase in voltage for the commercial membrane and a small increase for the Disclosed membrane. This indicates that the commercial membrane exhibits higher internal resistance, lower membrane stability, and reduced ionic conductivity retention. In contrast, the Disclosed membrane remains stable throughout the test duration, even with the increase in current density, indicating less membrane degradation and better long-term durability.

EXAMPLES

The following non-limiting examples are provided to further illustrate the present invention.

Example 1

A polymer was prepared from biphenyl, trifluoroacetone, and 4-(dimethoxymethyl)piperidine. The polymer was prepared by three major steps: (1) synthesis of a

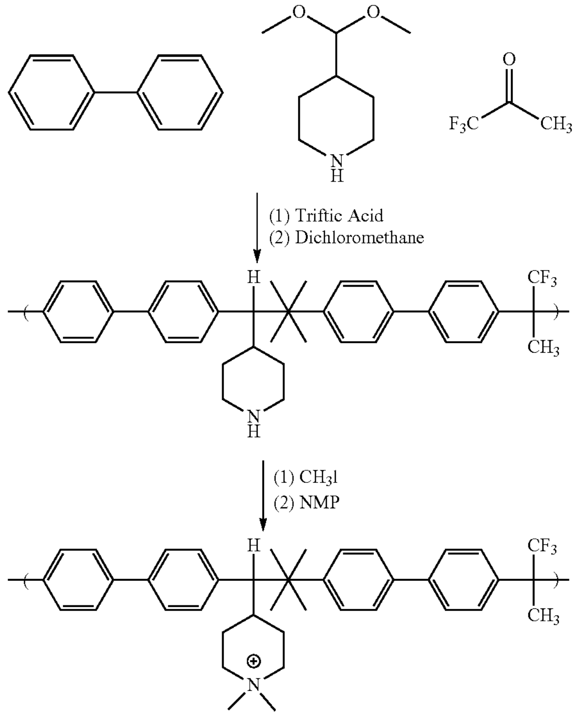

cyclic-amine-functionalized ketal intermediate polymer, (2) synthesis of a quaternized-amine-functionalized ketal polymer, and (3) membrane casting. The reaction scheme is depicted below:

(1) synthesis of a cyclic-amine-functionalized ketal intermediate polymer.

(2) synthesis of a quaternized-amine-functionalized ketal polymer (3) membrane casting

Definitions

The term "alkyl," as used herein, refers to a linear, branched or cyclic hydrocarbon radical, preferably having 1 to 20 carbon atoms (i.e., 1, 2, 3, 4, 5, 6, 7, 8, 9, 10, 11, 12, 13, 14, 15, 16, 17, 18, 19, 20 carbons), and more preferably having 1 to 6 carbon atoms. Alkyl groups include, but are not limited to, methyl, ethyl, n-propyl, isopropyl, n-butyl, isobutyl, secondary-butyl, and tertiary-butyl. Alkyl groups can be unsubstituted or substituted by one or more suitable substituents.

The term "cycloalkyl," as used herein, refers to a cycloalkane by removal of a hydrogen atom from a ring and has the general formula $—C_nH_{2n-1}$. The cycloalkyl group preferably having 5 to 10 carbon atoms (i.e., 5, 6, 7, 8, 9, 10 carbons), and more preferably having 4 to 6 carbon atoms. Examples of cycloalkyl groups include, but are not limited to, cyclopropyl, cyclobutyl, cyclopentyl, cyclohexyl, cycloheptyl, and cyclooctyl. Cycloalkyl groups may be unsubstituted or substituted by one or more suitable substituents. A cycloalkyl may further encompass saturated monocyclic or polycyclic ring systems in which one or more ring carbon atoms are replaced with a heteroatom, such as nitrogen, resulting in a heterocyclic cycloalkyl structure. In particular, a cycloalkyl group may include one or more nitrogen atoms within the ring, forming nitrogen-containing saturated heterocycles. Non-limiting examples of such nitrogen-containing cycloalkyl groups include azetidinyl (four-membered ring with one nitrogen), pyrrolidinyl (five-membered ring with one nitrogen), piperidinyl (six-membered ring with one nitrogen), piperazinyl (six-membered ring with two nitrogen), azepanyl (seven-membered ring with one nitrogen), and morpholinyl (six-membered ring with one nitrogen and one oxygen). Such heterocyclic cycloalkyl groups may be optionally substituted and are considered within the scope of the term "cycloalkyl" unless otherwise specified.

The term "aromatic," as used herein, refers to a hydrocarbon or heteroatom-containing ring system that includes at least one fully conjugated cyclic π-electron system following Huckel's rule (4n+2 π electrons). Aromatic groups may include monocyclic or fused polycyclic systems. Examples of aromatic groups include, but are not limited to, phenyl, naphthyl, anthracenyl, and phenanthrenyl. Aromatic groups may be unsubstituted or substituted by one or more suitable substituents.

The term "heteroaromatic," as used herein, refers to an aromatic ring system containing one or more heteroatoms selected from nitrogen, oxygen, or sulfur in the ring. Heteroaromatic groups may include monocyclic or fused polycyclic systems. Examples of heteroaromatic groups include, but are not limited to, pyridyl, pyrimidinyl, imidazolyl, thiazolyl, thiophenyl, furanyl, indolyl, benzothiazolyl, and quinolinyl. Heteroaromatic groups may be unsubstituted or substituted by one or more suitable substituents.

The term "polycyclic aromatic," as used herein, refers to an aromatic group comprising two or more fused aromatic rings in which adjacent rings share two or more contiguous carbon atoms, forming a fused ring system. Fused aromatic rings may be composed entirely of carbon atoms (i.e., hydrocarbon polycyclic aromatics) or may include one or more heteroatoms selected from nitrogen, oxygen, or sulfur within the ring system, forming heteroaromatic polycyclic structures. In some embodiments, polycyclic aromatic group includes a fused bicyclic or tricyclic ring system. Non-limiting examples of polycyclic aromatic groups may include naphthyl, anthracenyl and phenanthrenyl, fluorenyl, carbazolyl, and dibenzothiophenyl. Polycyclic aromatic groups may be unsubstituted or substituted by one or more suitable substituents, including but not limited to alkyl, alkoxy, halogen, cyano, nitro, amino, and hydroxyl groups. Unless otherwise specified, the term "polycyclic aromatic" encompasses both fully hydrocarbon and heteroatom-containing fused aromatic systems. The term "amino," as used herein, refers to the functional group $—NH_2$ as well as substituted amino groups having one or two substituents on the nitrogen atom. Substituted amino groups may include alkylamino (e.g., $—NHCH_3$), dialkylamino (e.g., $—N(CH_3)_2$), arylamino, or heteroaryl-substituted amino groups.

The term "sulfide," as used herein, refers to a bivalent (i.e., difunctional) group containing a sulfur atom bonded to two carbon atoms or other substituents, represented by the structure —S—. Sulfide linkages may connect two alkyl, aryl, or heteroaryl groups.

The term "sulfonyl," as used herein, refers to a bivalent group having the structure $—SO_2—$, in which the sulfur atom is doubly bonded to two oxygen atoms and singly bonded to two carbon or heteroatom-containing groups. Sulfonyl groups may connect to alkyl, aryl, or heteroaryl moieties.

The term "methyl," as used herein, refers to the univalent group $—CH_3$. The methyl group may be unsubstituted or substituted by one or more suitable substituents.

The term "ether" as used herein represents a bivalent (i.e., difunctional) group including at least one ether linkage (i.e., —O—).

The term "hydrocarbons," as used herein, refers to organic compounds consisting exclusively of carbon and hydrogen atoms. Hydrocarbons include, but are not limited to, alkanes (saturated hydrocarbons), alkenes (unsaturated hydrocarbons with one or more carbon-carbon double bonds), alkynes (unsaturated hydrocarbons with one or more carbon-carbon triple bonds), cycloalkanes, and aromatic hydrocarbons. Hydrocarbons may be linear, branched, or cyclic, and may be unsubstituted or substituted by one or more suitable substituents.

The term "substituted" means that in the group in question, at least one hydrogen atom bound to a carbon atom is replaced with one or more substituent groups such as hydroxy (—OH), alkylthio, phosphino, halo (fluoro, chloro, bromo, or iodo), nitro (—$NO_2$), an ether (—$OR_A$ wherein $R_A$ is alkyl or aryl), an ester (—$OC(O)R_A$ wherein $R_A$ is alkyl or aryl), keto (—$C(O)R_A$ wherein $R_A$ is alkyl or aryl), heterocyclo, and the like. When the term "substituted" introduces or follows a list of possible substituted groups, it is intended that the term apply to every member of that group. That is, the phrase "optionally substituted alkyl" is to be interpreted as "optionally substituted alkyl." Likewise, the phrase "alkyl optionally substituted with fluoride" is to be interpreted as "alkyl optionally substituted with fluoride."

As various changes could be made in the above products and methods without departing from the scope of the invention, it is intended that all matter contained in the above description and shown in the accompanying drawings shall be interpreted as illustrative and not in a limiting sense.

What is claimed is:

1. A polymer comprising a reaction product of a polymerization mixture, comprising:

a multinuclear aromatic compound having a formula:

(1)

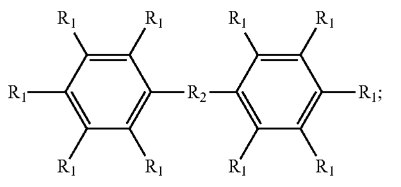

and a cyclic-amine-functionalized acetal or ketal having a formula:

(2)

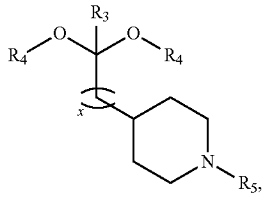

or an amine-functionalized acetal or ketal having a formula:

(3)

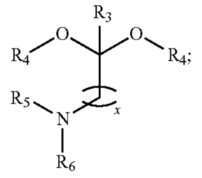

and a comonomer having a formula in any of a following group:

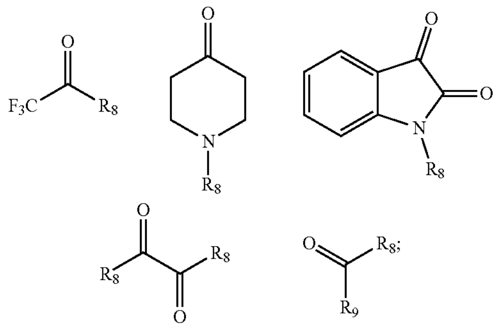

wherein:

R1 is each independently alkyl, aromatic, heteroaromatic, or hydrogen;

R2 is nothing, methylene, alkyl, aromatic, heteroaromatic, amino, sulfide, sulfonyl, or ether linkages;

R3 is hydrogen or methyl;

R4 is alkyl, or covalently linked to R4 to form a ring;

R5 is each independently hydrogen, alkyl, cyclic alkyl;

R6 is each independently hydrogen, alkyl, cyclic alkyl or covalently linked to R5 to form a ring;

R8 is hydrogen, alkyl, cyclic alkyl, aromatic, heteroaromatic;

R9 is heteroaromatic; and x is an integer from 0 to 6.

2. A polymer comprising a reaction product of an alkylating agent and the polymer of claim 1 comprising the reaction product of the polymerization mixture comprising:

the cyclic-amine-functionalized acetal or ketal; or the amine-functionalized acetal or ketal.

3. A polymer comprising a reaction product of a salt and the polymer of claim 2, wherein the salt comprises sodium fluoride, potassium fluoride, calcium fluoride, magnesium fluoride, ammonium fluoride, sodium chloride, potassium chloride, calcium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium nitrate, potassium nitrate, calcium nitrate, magnesium nitrate, ammonium nitrate, sodium hydroxide, potassium hydroxide, calcium hydroxide, magnesium hydroxide, ammonium hydroxide, sodium hexafluoroantimonate, potassium hexafluoroantimonate, calcium hexafluoroantimonate, magnesium hexafluoroantimonate, ammonium hexafluoroantimonate, sodium hexafluorophosphate, potassium hexafluorophosphate, calcium hexafluorophosphate, magnesium hexafluorophosphate, ammonium hexafluorophosphate, sodium cyanide, potassium cyanide, calcium cyanide, magnesium cyanide, ammonium cyanide, sodium acetate, potassium acetate, calcium acetate, magnesium acetate, ammonium acetate, sodium formate, potassium formate, calcium formate, magnesium formate, ammonium formate, sodium carbonate, potassium carbonate, calcium carbonate, magnesium carbonate, ammonium carbonate, sodium bicarbonate, potassium bicarbonate, calcium bicarbonate, magnesium bicarbonate, ammonium bicarbonate, sodium sulfate, potassium sulfate, calcium sulfate, magnesium sulfate, ammonium sulfate, sodium bisulfate, potassium bisulfate, calcium bisulfate, magnesium bisulfate, ammonium bisulfate, sodium phosphate, potassium phosphate, calcium phosphate, magnesium phosphate, ammonium phosphate, sodium hydrogen phosphate, potassium hydrogen phosphate, calcium hydrogen phosphate, magnesium hydrogen phosphate, ammonium hydrogen phosphate, sodium dihydrogen phosphate, potassium dihydrogen phosphate, calcium dihydrogen phosphate, magnesium dihydrogen phosphate, ammonium dihydrogen phosphate, sodium methanesulfonate, potassium methanesulfonate, calcium methanesulfonate, magnesium methanesulfonate, ammonium methanesulfonate, sodium trifluoromethanesulfonate, potassium trifluoromethanesulfonate, calcium trifluoromethanesulfonate, magnesium trifluoromethanesulfonate, ammonium trifluoromethanesulfonate, sodium p-toluenesulfonate, potassium p-toluenesulfonate, calcium p-toluenesulfonate, magnesium p-toluenesulfonate, ammonium p-toluenesulfonate, sodium nitrite, potassium nitrite, calcium nitrite, magnesium nitrite, ammonium nitrite, sodium chlorate, potassium chlorate, calcium chlorate, magnesium chlorate, ammonium chlorate, sodium bromate, potassium bromate, calcium bromate, magnesium bromate, ammonium bromate, sodium iodate, potassium iodate, calcium iodate, magnesium iodate, ammonium iodate, sodium bis(trifluoromethanesulfonyl)imide, potassium bis(trifluoromethanesulfonyl)imide, calcium bis(trifluoromethanesulfonyl)imide, magnesium bis(trifluoromethanesulfonyl)imide, or ammonium bis (trifluoromethanesulfonyl)imide.

4. The polymer of claim 1, wherein R1 is each independently alkyl, aromatic, heteroaromatic, or hydrogen; and R2 is nothing, methylene, alkyl, aromatic, heteroaromatic, amino, sulfide, sulfonyl, or ether linkages, wherein:

the aromatic or heteroaromatic groups of R1 or R2 comprise one or more fused ring structures including naphthalene, anthracene, fluorene, carbazole, B dibenzothiophene, and derivatives thereof.

5. The polymer of claim 1, wherein the cyclic-amine-functionalized acetal or B ketal comprises 4-(2,2-diethoxyethyl)piperidine, 4-(2,2-diethoxypropyl)piperidine, 4-(dimethoxymethyl)piperidine, 4-(1,3-dioxolan-2-yl)-1-methylpiperidine, 4-(dimethoxymethyl)-1,1-dimethylpiperidin-1-ium, 3-(dimethoxymethyl)-6-azaspiro [5.5]undecan-6-ium; the amine-functionalized acetal or ketal comprises 2,2-diethoxyethan-1-amine,2,2-diethoxypropan-1-amine, 2,2-diethoxy-N-methylpropan-1-amine, 2,2-diethoxy-N-methylethan-1-amine, 2,2-diethoxy-N,N-dimethylpropan-1-amine, 2,2-diethoxy-N,N-dimethylethan-1-amine, 3,3-diethoxypropan-1-amine, 4,4-diethoxybutan-1-amine, 4,4-diethoxy-N,N,N-trimethylbutan-1-aminium; the multinuclear aromatic compound comprises biphenyl, propane-2,2-diyldibenzene, diphenylmethane, diphenylsulfane, sulfonyldibenzene, oxydibenzene; the comonomer comprises trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, 1H-imidazole-5-carbaldehyde.

6. An anion exchange polymer (AEM), wherein the AEM comprising:

a first repeating unit of formula one:

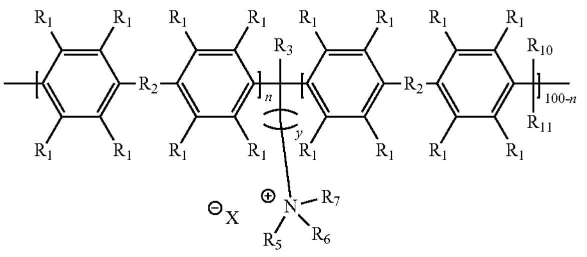

or, a second repeating unit of formula two:

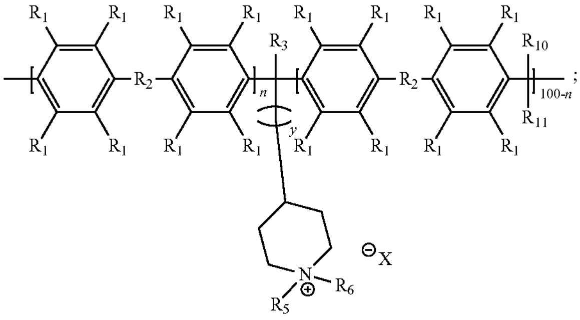

;

wherein:

R1 is each independently alkyl, aromatic, heteroaromatic, polycyclic aromatic, or hydrogen;

R2 is nothing, methylene, alkyl, aromatic, heteroaromatic, polycyclic aromatic, amino, sulfide, sulfonyl, or ether linkages;

R3 is hydrogen or methyl;

R5 is hydrogen, $C_1$-$C_{20}$ alkyl, and $C_5$-$C_{10}$ cycloalkyl;

R6 is hydrogen, $C_1$-$C_{20}$ alkyl, and $C_5$-$C_{10}$ cycloalkyl, or covalently linked to R5 to form a ring;

R7 is hydrogen, $C_1$-$C_{20}$ alkyl, and $C_5$-$C_{10}$ cycloalkyl;

R10 is each independently hydrogen or derived from polymerization products of comonomer;

R11 is each independently hydrogen or derived from polymerization products of comonomer;

y is an integer from 0 to 6, and optionally comprises a linear, branched, or cyclic hydrocarbons;

n is an integer corresponding to 1 to less than 100 mole % of a total repeating units in the polymer; and $X^-$ is an anion.

7. The AEM of claim 6, wherein R10 is derived from polymerization products of comonomer, wherein the comonomer comprises electron deficient ketone or aldehyde compounds, wherein the electron deficient ketone or aldehyde compounds comprises trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, or 1H-imidazole-5-carbaldehyde.

8. The AEM of claim 6, wherein R11 is derived from polymerization products of comonomer, wherein the comonomer comprises electron deficient ketone or aldehyde compounds, wherein the electron deficient ketone or aldehyde compounds comprises trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, or 1H-imidazole-5-carbaldehyde.

9. The AEM of claim 6, wherein the anion is selected from a group consisting of fluoride, chloride, bromide, iodide, nitrate, hydroxide, hexafluoroantimonate, hexafluorophosphate, cyanide, acetate, formate, carbonate, bicarbonate, sulfate, bisulfate, phosphate, hydrogen phosphate, dihydrogen phosphate, methane sulfonate (mesylate), trifluoromethanesulfonate (triflate), p-toluenesulfonate (tosylate), nitrite, chlorate, bromate, iodate, and bis(trifluoromethanesulfonyl) imide (bistriflimide).

10. A prepolymer, wherein the prepolymer comprising:

a first repeating unit of formula one:

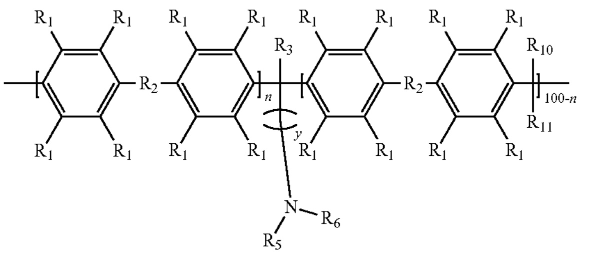

or, a second repeating unit of formula two:

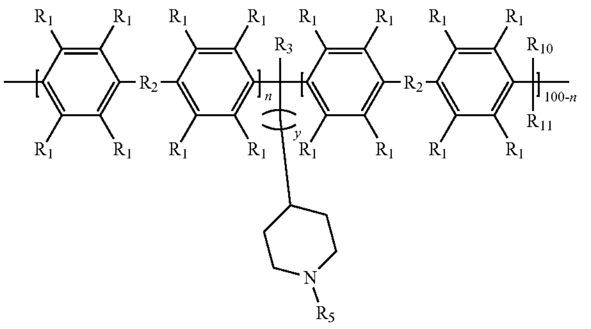

wherein:

R1 is each independently alkyl, aromatic, heteroaromatic, polycyclic aromatic, or hydrogen;

R2 is nothing, methylene, alkyl, aromatic, heteroaromatic, polycyclic aromatic, amino, sulfide, sulfonyl, or ether linkages;

R3 is hydrogen or methyl;

R5 is hydrogen, $C_1$-$C_{20}$ alkyl, and $C_5$-$C_{10}$ cycloalkyl;

R6 is hydrogen, $C_1$-$C_{20}$ alkyl, and $C_5$-$C_{10}$ cycloalkyl, or covalently linked to R5 to form a ring;

R10 is each independently hydrogen or derived from polymerization products of comonomer;

R11 is each independently hydrogen or derived from polymerization products of comonomer;

y is an integer from 0 to 6, and optionally comprises a linear, branched, or cyclic hydrocarbons;

n is an integer corresponding to 1 to less than 100 mole % of a total repeating units in the prepolymer.

11. The prepolymer of claim 10, wherein R10 is derived from polymerization products of comonomer, wherein the comonomer comprises electron deficient ketone or aldehyde compounds, wherein the electron deficient ketone or aldehyde compounds comprises trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, or 1H-imidazole-5-carbaldehyde.

12. The prepolymer of claim 10, wherein R11 is derived from polymerization products of comonomer, wherein the comonomer comprises electron deficient ketone or aldehyde compounds, wherein the electron deficient ketone or aldehyde compounds comprises trifluoroacetone, trifluoroacetaldehyde, piperidin-4-one, indoline-2,3-dione, isonicotinaldehyde, 1-(pyridin-4-yl)ethan-1-one, 1-methylpiperidin-4-one, 1-propylindoline-2,3-dione, cyclohexane-1,2-dione, oxalaldehyde, or 1H-imidazole-5-carbaldehyde.

13. A method of making the polymer of claim 3, the method comprising:

reacting the multinuclear aromatic compound, the cyclic-amine-functionalized acetal or ketal or the amine-functionalized acetal or ketal, and an optional comonomer in a presence of first solvent and a polymerization catalyst to form an amine-functionalized acetal or ketal intermediate polymer;

precipitating the amine-functionalized acetal or ketal intermediate polymer using aqueous solvent to form a solid amine-functionalized acetal or ketal intermediate polymer;

dissolving the solid amine-functionalized acetal or ketal intermediate polymer in second solvent;

alkylating the amine-functionalized acetal or ketal intermediate polymer using an alkylating agent in the presence of a second solvent to form quaternized-amine-functionalized acetal or ketal intermediate polymer; and reacting the quaternized-amine-functionalized acetal or ketal intermediate polymer with salt to form the polymer.

14. A method of making an anion exchange polymer membrane comprising the polymer of claim 6, the method comprising:

reacting multinuclear aromatic compound, cyclic-amine-functionalized acetal or ketal or amine-functionalized acetal or ketal, and an optional comonomer in a presence of first solvent and a polymerization catalyst to form an amine-functionalized acetal or ketal intermediate polymer;

precipitating the amine-functionalized acetal or ketal intermediate polymer using precipitation solvent to form a solid amine-functionalized acetal or ketal intermediate polymer;

dissolving the solid amine-functionalized acetal or ketal intermediate polymer in second solvent;

alkylating the amine-functionalized acetal or ketal intermediate polymer using an alkylating agent in the presence of a second solvent to form quaternized-amine-functionalized acetal or ketal intermediate polymer;

reacting the quaternized-amine-functionalized acetal or ketal intermediate polymer with salt to form a polymer solution;

precipitating a quaternized-amine-functionalized acetal or ketal functionalized polymer from the polymer solution using precipitation solvent to a dried polymer powder; and casting a final polymer product solution to form an anion exchange polymer membrane.

15. The method of claim 14, wherein the polymerization catalyst comprises trifluoromethanesulfonic acid, fluorosulfuric acid, magic acid, fluoroantimonic acid, methanesulfonic acid, fluoroboric acid, or bistriflimidic acid.

16. The method of claim 14, wherein the alkylating agent comprises methyl iodide, iodoethane, 1-iodopropane, 1-iodobutane, 1-iodopentane, 1-iodohexane, methyl bromide, ethyl bromide, n-propyl bromide, n-butyl bromide, 1-bromopentane, 1-bromohexane, methyl chloride, ethyl chloride, n-propyl chloride, n-butyl chloride, 1-chloropentane, 1-chlorohexane or a combination thereof.

17. The method of claim 14, wherein the first solvent comprises dichloromethane, chloroform, 1,2-dichloroethane, tetrachloroethane, or nitrobenzene.

18. The method of claim 14, wherein the salt comprises sodium fluoride, potassium fluoride, calcium fluoride, magnesium fluoride, ammonium fluoride, sodium chloride, potassium chloride, calcium chloride, magnesium chloride, ammonium chloride, sodium bromide, potassium bromide, calcium bromide, magnesium bromide, ammonium bromide, sodium iodide, potassium iodide, calcium iodide, magnesium iodide, ammonium iodide, sodium nitrate, potassium nitrate, calcium nitrate, magnesium nitrate, ammonium nitrate, sodium hydroxide, potassium hydroxide, calcium hydroxide, magnesium hydroxide, ammonium hydroxide, sodium hexafluoroantimonate, potassium hexafluoroantimonate, calcium hexafluoroantimonate, magnesium hexafluoroantimonate, ammonium hexafluoroantimonate, sodium hexafluorophosphate, potassium hexafluorophosphate, calcium hexafluorophosphate, magnesium hexafluorophosphate, ammonium hexafluorophosphate, sodium cyanide, potassium cyanide, calcium cyanide, magnesium cyanide, ammonium cyanide, sodium acetate, potassium acetate, calcium acetate, magnesium acetate, ammonium acetate, sodium formate, potassium formate, calcium formate, magnesium formate, ammonium formate, sodium carbonate, potassium carbonate, calcium carbonate, magnesium carbonate, ammonium carbonate, sodium bicarbonate, potassium bicarbonate, calcium bicarbonate, magnesium bicarbonate, ammonium bicarbonate, sodium sulfate, potassium sulfate, calcium sulfate, magnesium sulfate, ammonium sulfate, sodium bisulfate, potassium bisulfate, calcium bisulfate, magnesium bisulfate, ammonium bisulfate, sodium phosphate, potassium phosphate, calcium phosphate, magnesium phosphate, ammonium phosphate, sodium hydrogen phosphate, potassium hydrogen phosphate, calcium hydrogen phosphate, magnesium hydrogen phosphate, ammonium hydrogen phosphate, sodium dihydrogen phosphate, potassium dihydrogen phosphate, calcium dihydrogen phosphate, magnesium dihydrogen phosphate, ammonium dihydrogen phosphate, sodium methanesulfonate, potassium methanesulfonate, calcium methanesulfonate, magnesium methanesulfonate, ammonium methanesulfonate, sodium trifluoromethanesulfonate, potassium trifluoromethanesulfonate, calcium trifluoromethanesulfonate, magnesium trifluoromethanesulfonate, ammonium trifluoromethanesulfonate, sodium p-toluenesulfonate, potassium p-toluenesulfonate, calcium p-toluenesulfonate, magnesium p-toluenesulfonate, ammonium p-toluenesulfonate, sodium nitrite, potassium nitrite, calcium nitrite, magnesium nitrite, ammonium nitrite, sodium chlorate, potassium chlorate, calcium chlorate, magnesium chlorate, ammonium chlorate, sodium bromate, potassium bromate, calcium bromate, magnesium bromate, ammonium bromate, sodium iodate, potassium iodate, calcium iodate, magnesium iodate, ammonium iodate, sodium bis(trifluoromethanesulfonyl)imide, potassium bis(trifluoromethanesulfonyl)imide, calcium bis(trifluoromethanesulfonyl)imide, magnesium bis(trifluoromethanesulfonyl)imide, or ammonium bis(trifluoromethanesulfonyl)imide.

19. The method of claim 14, wherein the precipitation solvent independently comprises water, methanol, hexane, chloroform, tetrahydrofuran, isopropanol, ethanol, acetone, or mixtures thereof.

20. The method of claim 14, wherein the second solvent independently comprises tetrahydrofuran, dichloromethane, chloroform, N,N-dimethylformamide, dimethyl sulfoxide chloroform, 1,1,2-trichloroethylene, benzene, toluene, chlorobenzene, bromobenzene, N-methyl pyrrolidone, N,N-dimethylacetamide, or acetonitrile.

21. An anion exchange membrane (AEM) comprising the polymer of claim 6, wherein the AEM is configured and sized to be suitable for use in a water electrolyzer, $CO_2$ electrolyzer, redox flow batteries, electrodialysis, reverse electrodialysis, hydrogen pump, and batteries.

22. An anion exchange membrane water electrolyzer comprising the polymer of claim 6.

* * * * *